United States Patent
Choe et al.

(10) Patent No.: US 10,868,842 B2
(45) Date of Patent: Dec. 15, 2020

(54) AUTOMATIC RESPONSES TO INCOMING CALLS BASED ON USER ACTIVITY

(71) Applicant: Microsoft Technology Licensing, LLC, Redmond, WA (US)

(72) Inventors: Calvin Choe, Redmond, WA (US); Shai Guday, Redmond, WA (US); Michael Kostersitz, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

(21) Appl. No.: 15/412,794

(22) Filed: Jan. 23, 2017

(65) Prior Publication Data
US 2018/0213088 A1 Jul. 26, 2018

(51) Int. Cl.
*H04L 29/06* (2006.01)
*H04M 3/42* (2006.01)
(Continued)

(52) U.S. Cl.
CPC ...... *H04L 65/1073* (2013.01); *H04L 65/1016* (2013.01); *H04L 65/1069* (2013.01);
(Continued)

(58) Field of Classification Search
CPC .................................................... H04W 4/22
See application file for complete search history.

(56) References Cited

U.S. PATENT DOCUMENTS

2001/0031633 A1 10/2001 Tuomela et al.
2004/0203794 A1 10/2004 Brown et al.
(Continued)

FOREIGN PATENT DOCUMENTS

CN 103237276 A 2/2011
CN 103078995 A 5/2013

OTHER PUBLICATIONS

Horowitz, Paul, "Respond to Incoming Phone Calls with Automatic Message Replies on iPhone", Published on: Nov. 27, 2012 Available at: http://osxdaily.com/2012/11/27/respond-incoming-phone-calls-message/ (4 pages total).

*Primary Examiner* — Kevin M Cunningham
(74) *Attorney, Agent, or Firm* — Mark K. Young; Mayer & Williams, PC

(57) ABSTRACT

An automatic response service supported on an application server that interoperates with an IMS (IP Multimedia Subsystem) core network is configured to dynamically generate responses to unanswered incoming telephone calls to a user's computing devices that are customized for the calling party based on monitored activities of the user, device capabilities and state, and related context. The automatic response service can monitor the user's interactions across a range of computing devices to identify a device with which the is actively engaged. Data from device registrations with the IMS core network can indicate current device capabilities and device state such as peripheral device configuration and network connectivity. Along with call data such as caller ID, the monitored user activities and device information enable the service to automatically respond to incoming calls on behalf of the user with information that is meaningful and contextually-relevant to the calling party.

19 Claims, 26 Drawing Sheets

(51) Int. Cl.
   *H04M 3/51* (2006.01)
   *H04M 3/527* (2006.01)
(52) U.S. Cl.
   CPC .... *H04M 3/42263* (2013.01); *H04M 3/42136* (2013.01); *H04M 3/42365* (2013.01); *H04M 3/5116* (2013.01); *H04M 3/527* (2013.01)

(56) References Cited

U.S. PATENT DOCUMENTS

| | | |
|---|---|---|
| 2008/0207173 A1 | 8/2008 | Jendbro |
| 2010/0048256 A1 | 2/2010 | Huppi et al. |
| 2012/0185604 A1* | 7/2012 | Shatsky .............. H04L 65/1069 |
| | | 709/228 |
| 2012/0315880 A1 | 12/2012 | Peitrow et al. |
| 2013/0097269 A1 | 4/2013 | Plotkin |
| 2013/0303106 A1 | 11/2013 | Martin |
| 2014/0057610 A1 | 2/2014 | Olincy et al. |
| 2014/0179281 A1 | 6/2014 | Kim et al. |
| 2014/0205076 A1* | 7/2014 | Kumar .............. H04M 3/42042 |
| | | 379/142.01 |
| 2014/0206321 A1 | 7/2014 | Mohapatra |
| 2015/0030143 A1 | 1/2015 | Bhogal et al. |
| 2016/0072937 A1* | 3/2016 | Gavney, Jr. ............ H04M 1/642 |
| | | 455/412.1 |
| 2016/0353333 A1* | 12/2016 | Jamadagni ........ H04W 36/0022 |
| 2017/0052613 A1* | 2/2017 | Alameh ................... G06F 3/165 |
| 2018/0032997 A1* | 2/2018 | Gordon ............. G06Q 20/3224 |
| 2018/0097934 A1* | 4/2018 | Yalamanchili .... H04M 3/42374 |

\* cited by examiner

AUTOMATIC RESPONSES TO INCOMING CALLS BASED ON USER ACTIVITY

BACKGROUND

Users can make and receive telephone calls on a wide variety of computing devices including mobile phones, tablet computers, wearable computers, and personal computers when such devices are registered to operate on IP-based (Internet Protocol) networks.

SUMMARY

An automatic response service supported on an application server that interoperates with an IMS (Internet Protocol Multimedia Subsystem) core network is configured to dynamically generate responses to unanswered incoming telephone calls to a user's computing devices that are customized for the calling party based on monitored activities of the user, device capabilities and device state, and related context. The automatic response service can monitor the user's interactions across a range of computing devices to identify a device with which the is actively engaged. Data from device registrations with the IMS core network can indicate current device capabilities and device state such as peripheral device configuration and network connectivity. Along with call data such as caller ID, the monitored user activities and device information enable the service to automatically respond to incoming calls on behalf of the user with information that is meaningful and contextually-relevant to the calling party.

In various illustrative examples, the automatic response service can respond to an incoming call using synthesized voice, video, shared files, multimedia, and text-based messaging using IMS services such as RCS (Rich Communication Service) or using over the top (OTT) services. By analyzing available input data, the service can dynamically generate a response that is appropriate to the user's circumstances. For example, the service can determine that the user is actively playing a game on a multimedia console that is further determined to lack a microphone to support voice telephony. When the user lets a call to the console to go unanswered, the automatic response service can respond with an announcement using the call's audio to inform the calling party that the user is playing a game and lacks the needed equipment to take the call. In another example, the user's device is registered for IMS services, but its connection to an access network such as a cellular data network is intermittent with low QoS (Quality of Service) that would result in sub-optimal voice telephony experience. In this case, the automatic response system can announce to the calling party that a recommended way to communicate with the user is through text messaging which is often more tolerant of poor network conditions.

Devices can be configured with a local automatic response client that facilitates the collection of supplemental data that can be provided to the remote service to enable the service to dynamically generate responses to incoming calls that includes more contextually relevant information, or which provide a higher degree of customization. Supplemental data can be collected, for example, from device sensors and from user interactions with applications such as calendar and scheduling applications that execute on the device.

System settings can be exposed through a user interface (UI) on a device to enable the user to tailor how the automatic responses are generated and delivered. For example, the user may wish to provide details of activities in a dynamically generated response only when the calling party is known (e.g., on her contact list), or is a member of a particular group (e.g., friends, colleagues, family members, club members). A more generic and less revealing message can be used in other situations. For example, the user may want to reveal that she is playing a game to her friends in a response, but not to her co-workers. The user may also set behaviors of the automatic response service so that the automated reply takes the form of an audio response in some cases while taking the form of a text-based message in other situations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
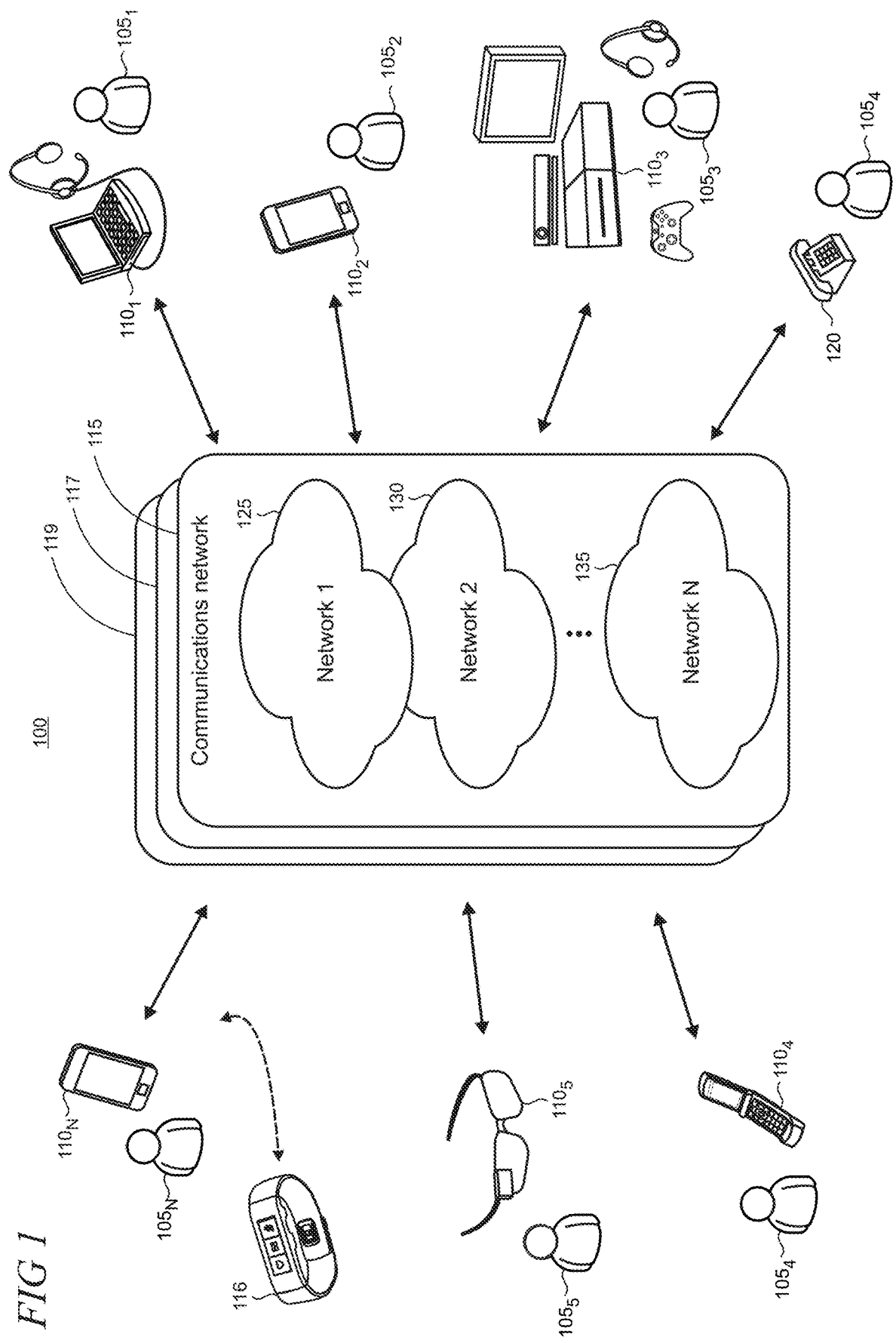
FIG. 1 shows an illustrative telecommunications environment in which devices having telephony capabilities communicate over a communications network that includes multiple parts.

FIG. 1 shows an illustrative telecommunications environment 100 in which the same or different users 105 may employ devices 110 that can communicate with other devices and various services over a network 115. In some cases, other networks 117 and 119 which may be similarly configured as network 115 can also be supported in the telecommunications environment 100. For example, some of the users 105 and devices 110 can have an association such as subscription, contract, plan, and the like with one of the networks (or otherwise be an authorized to access and use the network), while other users 105 and devices 110 can have an association with another one of the networks. The networks 115, 117, and 119 can be operated by different entities which may include service providers, mobile operators, enterprises, and the like. The depiction of three networks in this example is illustrative as the number of networks utilized in the telecommunications environment 100 can vary by implementation.

The devices 110 can support telephony capabilities (e.g., voice and/or video, text, or chat) and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or video calls, share multimedia, engage in messaging (e.g., texting) and email communications, use applications, and access services that employ data, browse the World Wide Web, and the like.

Other types of electronic devices are also envisioned to be usable within the environment 100 including handheld computing devices, PDAs (personal digital assistants), portable media players, devices that use headsets and earphones (e.g., Bluetooth-compatible devices), phablet devices (i.e., combination smartphone/tablet devices), wearable computing devices such as head-mounted display (HMD) systems and smartwatches, navigation devices such as GPS (Global Positioning System) systems, laptop PCs (personal computers), desktop computers, multimedia consoles, gaming systems, or the like. In the discussion that follows, the use of the term "device" is intended to cover all devices that are configured with telephony communications capabilities and/or are otherwise enabled for IMS (Internet Protocol Multimedia Subsystem) services, as discussed in more detail below, and are capable of connectivity to one or more of the networks 115, 117, or 119.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited user interface. Some devices may support video consumption and Internet browsing, while other devices may support more limited media handling and network interface features.

Accessory devices 116, such as wristbands and other wearable computing devices may also be present in the environment 100. Such accessory device 116 is typically adapted, but not limited to interoperate with a coupled device 110 using a short range communication protocol like Bluetooth to support functions such as monitoring of the wearer's fitness and/or physiology (e.g., heart rate, steps taken, calories burned, etc.) and environmental conditions (temperature, humidity, ultra-violet (UV) levels, etc.), and surfacing notifications from the coupled device 110 or the network directly. Some accessory devices can be configured to work on a standalone basis (i.e., without relying on a coupled device 110 for functionality such as Internet connectivity) as wearable computing devices that may support an operating system and applications.

Other types of telephony equipment may also be present in the telecommunications environment 100 such as conventional desktop phones 120 which are operatively coupled to a public switched telephone network ("PSTN"). Other examples may include equipment that connects to the PSTN using private branch exchanges ("PBXs") and equipment coupled to call services that are accessed using telephone numbers.

The devices 110 can typically utilize the network 115 to access and/or implement various user experiences. As discussed in more detail below, the communications network 115 can include multiple parts as indicated by reference numerals 125, 130, and 135. The network 115 can include different network types and network infrastructure in various combinations or sub-combinations including cellular networks, satellite networks, IP (Internet-Protocol) networks such as Wi-Fi under IEEE 802.11 and Ethernet networks under IEEE 802.3, a public switched telephone network (PSTN), and/or short range networks such as Bluetooth® networks. The network infrastructure can be supported, for example, by mobile operators, enterprises, Internet service providers (ISPs), telephone service providers, data service providers, and the like.

Figure 2:
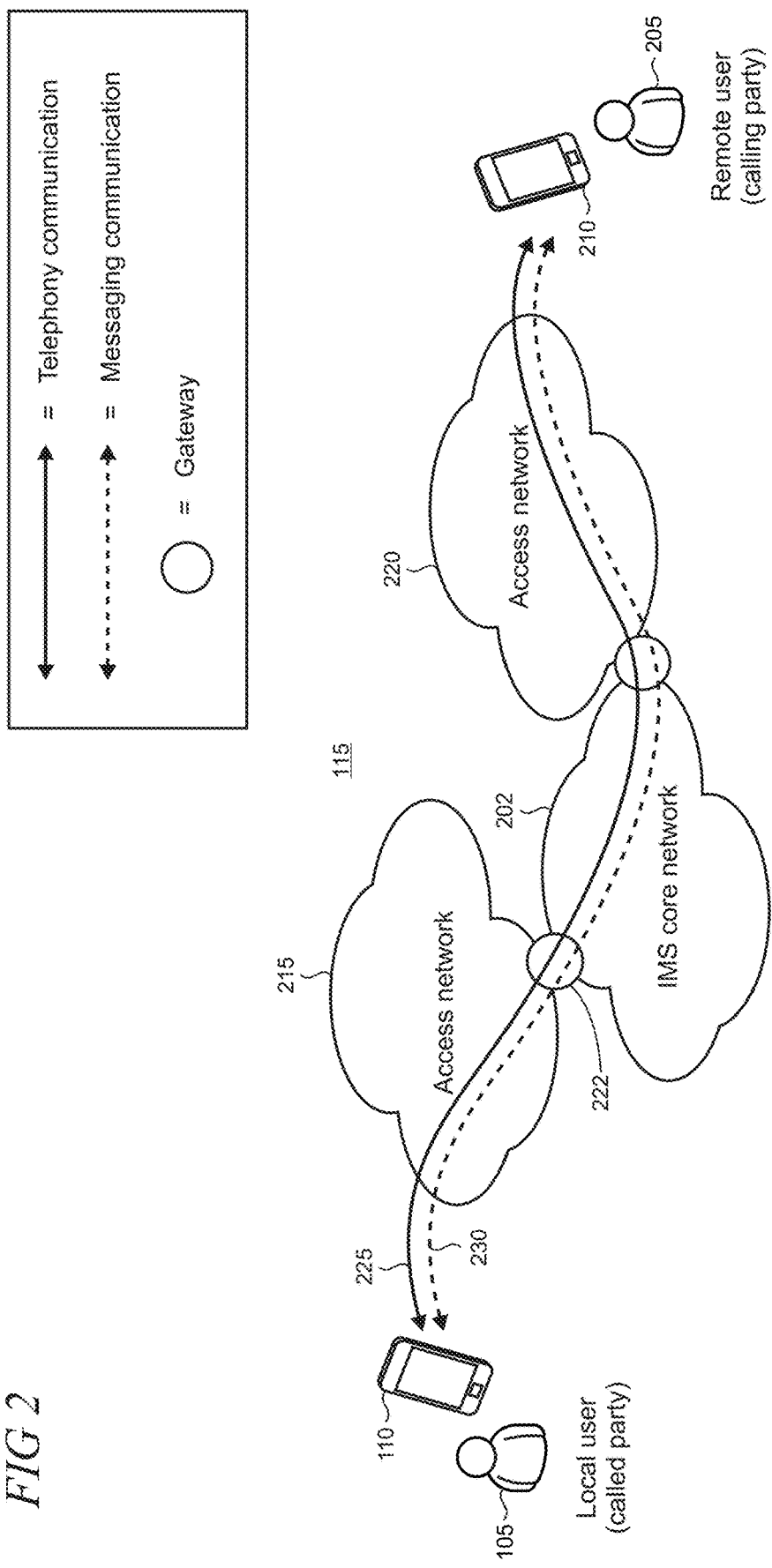
FIG. 2 shows illustrative communications between devices that are carried over different network types.

FIG. 2 shows an illustrative example of a communications network 115 that comprises an IMS core network 202 and respective access networks 215 and 220 that are operatively coupled to network elements such as a gateway, as representatively indicated by reference numeral 222. Although the access networks can be any of the above-noted types, access network 215 in this example may be a cellular network and access network 220 may be a Wi-Fi network. The respective access networks enable a device 110 associated with a local user 105 (typically referred to as a "called party" in a telephony context) and a device 210 associated with a remote user 210 (the "calling party") to access the IMS core network 202 which provides for switching, routing, transport and other functionalities, as described in more detail below in the text accompanying FIG. 3.

The users 105 and 210 may typically utilize the communications network 115 to make and receive telephony communications including voice and/or video calls, as indicated by reference numeral 225. The users may also engage in messaging communications 230. In some cases, other types of communications and features may also be supported on the network 115 such as multimedia sharing, file transfer, group chat and other services (not shown). These features may be described, for example, as Rich Communication Services (RCS) under the GSMA (Global System for Mobile Communications Association). OTT features and services may also be supported on the network 115.

Figure 3:
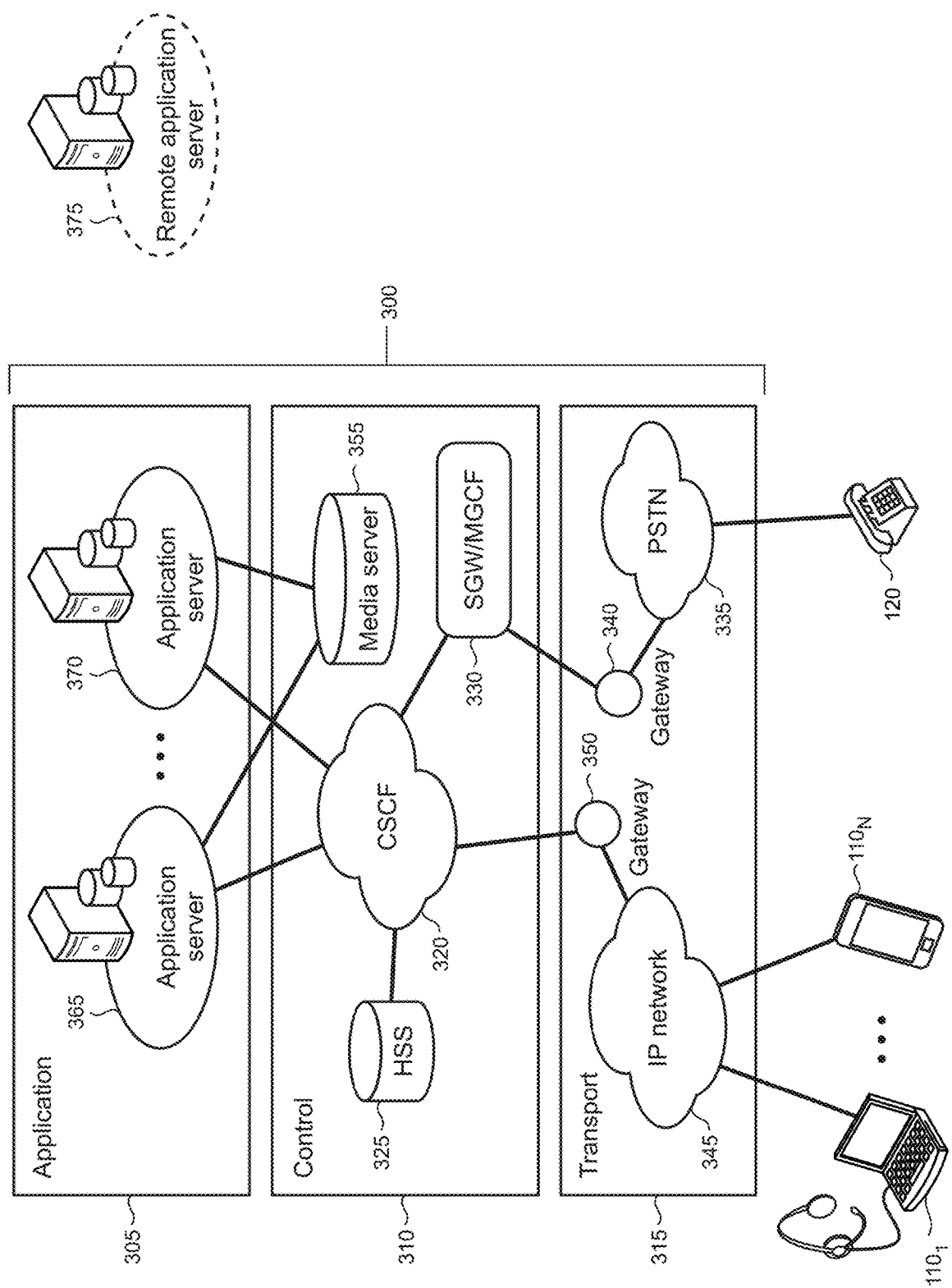
FIG. 3 shows an illustrative layered architecture for an IP (Internet Protocol) Multimedia Subsystem (IMS) network.

FIG. 3 shows an illustrative layered IMS architecture 300 which is shown in simplified form to highlight the functionality of certain elements. The architecture 300 decomposes the network into logically distinct application, control, and transport layers, as respectively indicated by reference numerals 305, 310, and 315, with standardized interfaces that enable scalability, flexibility, and extensibility. IMS uses standardized methods and protocols described by 3GPP (3rd Generation Partnership Project) and various RFCs (Request for Comments).

The control layer 310 is often referred to as the IMS core as it is responsible for regulating communications flows (in this description, the term IMS core network refers to infrastructure supporting IMS functionality in general). The main functional elements of the control layer 310 include a Call Session Control Function (CSCF) 320 that is configured for controlling sessions between devices and applications. A Home Subscriber Server (HSS) 325 is a database maintaining user profile information which is used to authenticate and authorize network subscribers. A Signaling Gateway (SGW) and Media Gateway Control Function (MGCF) 330 provides interoperability with a PSTN 335 using a gateway 340 to the transport layer 315. The transport layer further supports an IP (Internet Protocol) network 345 and respective gateway 350. A media server 355 in the control layer 310 supports media-related functions such as playing of tones, playing announcements using synthesized speech, and the like.

The transport layer 315 is the network-access layer that enables devices 110 to connect to the IMS core network and establish IP connectivity. Once a device 110 has an IP address and can exchange SIP (Session Initiation Protocol) messages, it becomes capable of interacting with an IMS core network, independent of the underlying network-access technology.

The application layer 305 supports various application servers 365 and 370. While application servers can be included as part of infrastructure in a given IMS network, remote application servers can also be utilized in some implementations, as indicated by reference numeral 375. Application servers are typically configured as an IMS network element to provide services to an end user (e.g. users 105 and 205 in FIG. 2) and thus may provide the business logic in an IMS network. Such services may include, for example, conference bridging, text to speech, billing, interactive voice response, and the like. The application servers 365, 370, and 375 communicate with the IMS core network using SIP.

Figure 4:
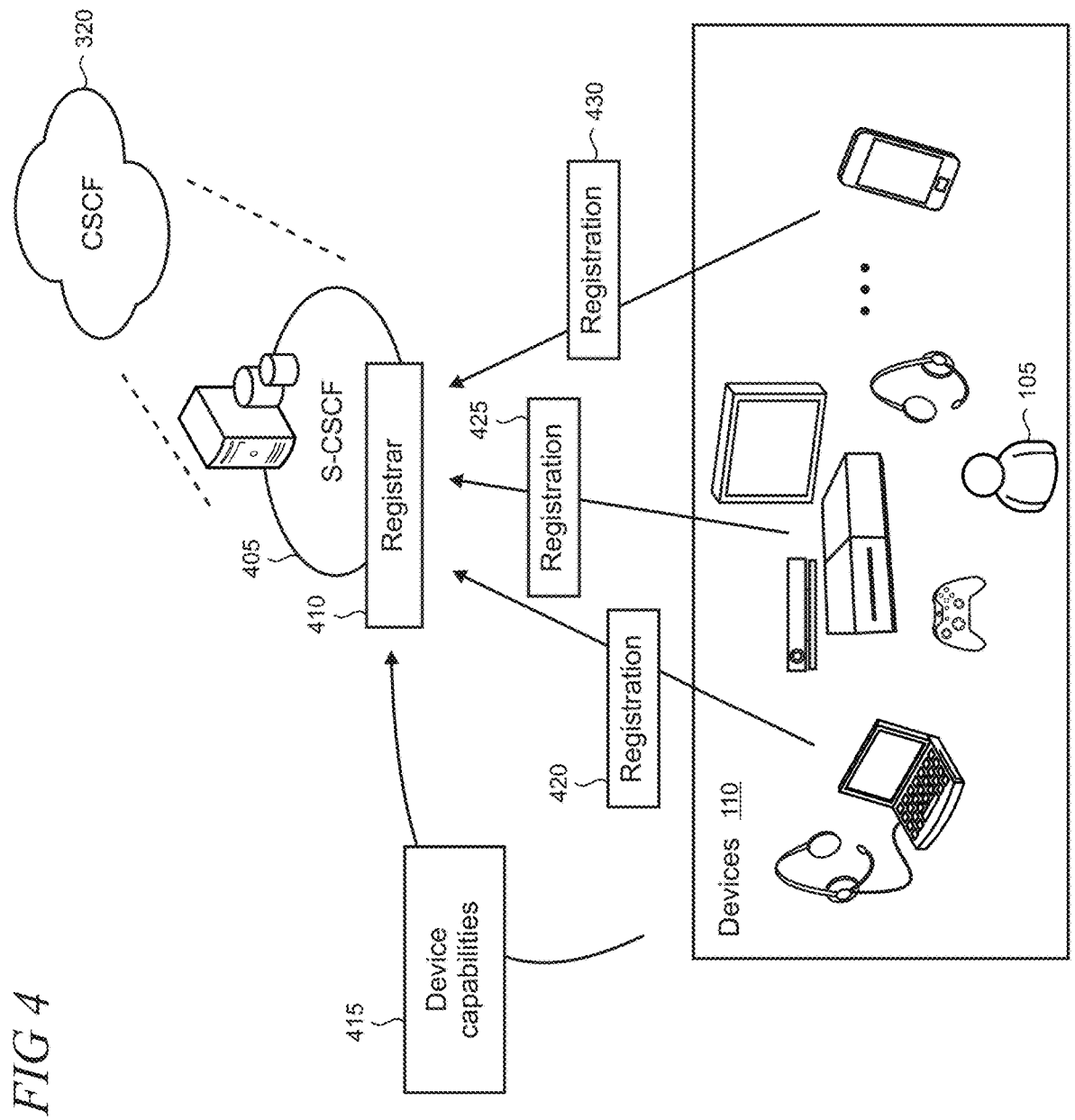
FIG. 4 shows illustrative devices registering with a registrar exposed by an IMS network.

The CSCF 320 can play three discrete roles: Serving-CSCF (S-CSCF), Interrogating-CSCF (I-CSCF), or Proxy-CSCF (P-CSCF) which each use SIP signaling. As shown in FIG. 4, an S-CSCF 405 exposes a registrar 410 that receives registration information 420, 425, and 430 from respective devices 110 that are associated with a user 105 when the devices register with the IMS core network for IMS services using suitable SIP messages. More than one of the user's devices 110 can be registered at the same time, and devices can maintain registration with the network or discontinue registration over time. For example, the user 105 may associate a common phone number with one or more of her devices so that an incoming phone call from the calling party (not shown) will ring on each of the devices that is currently registered with the IMS core network. Alternatively, the user may select devices for registration so that only the device that she is using at the time will receive ring signaling from the network.

The registration process can further enable device capabilities to be shared with the network, as indicated by reference numeral 415. Device capabilities may include or describe, for example, a capability of the device to support RCS or other features and/or services, device configuration including the presence or absence of components and/or peripheral equipment (e.g., camera, microphone); device state (e.g., battery charge level, network connectivity status), applications installed and/or utilized, and/or other suitable information. Device capabilities are often dynamic and current device capabilities can be periodically refreshed with the IMS core network as part of a registration process or as a part of a separate process.

Figure 5:
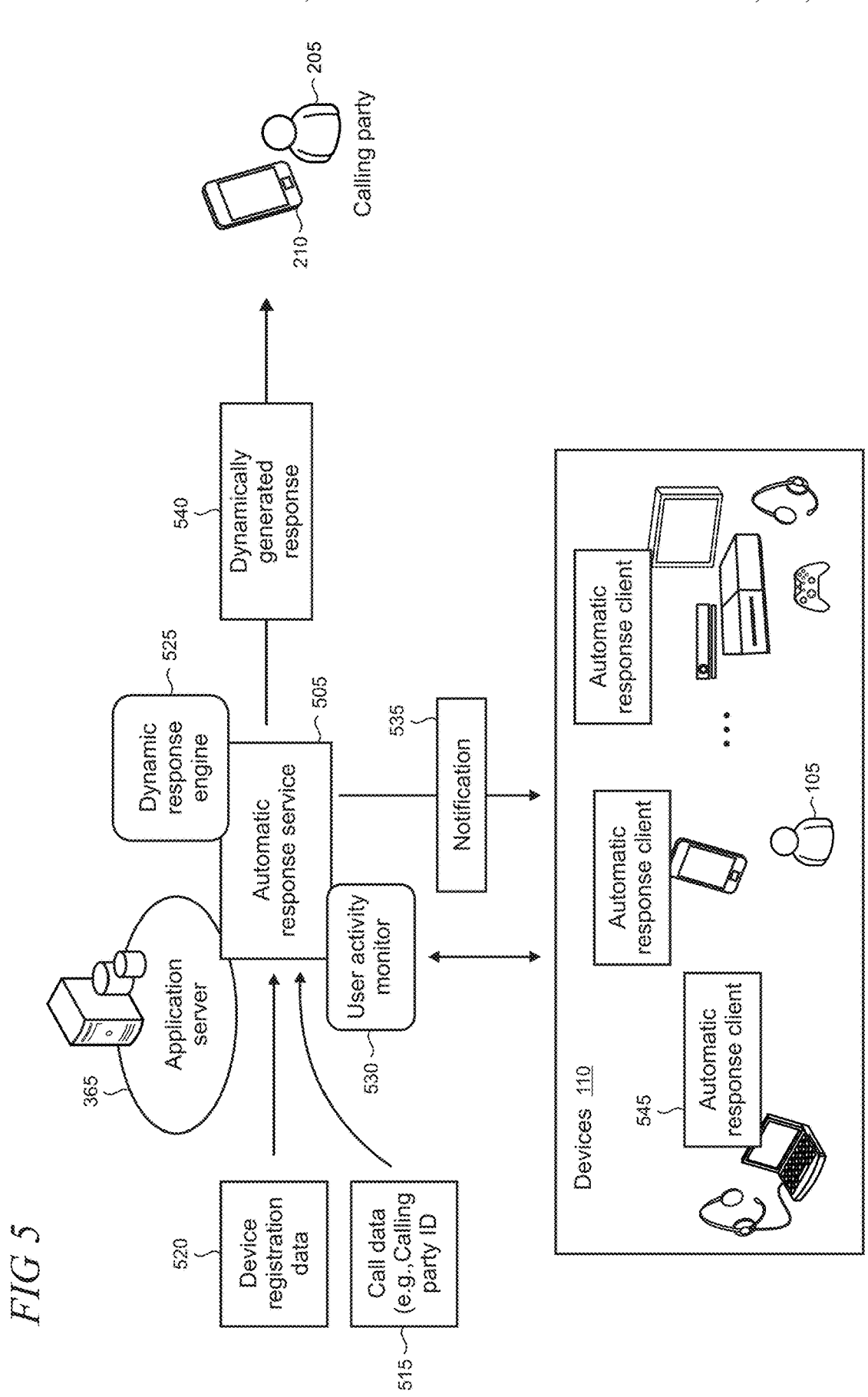
FIG. 5 shows an illustrative automatic response service that is supported by an application server in an IMS core network.

FIG. 5 shows an illustrative automatic response service 505 that is supported by an application server 365 in the IMS core network 202 (FIG. 2). The automatic response service is configured to receive device registration data 520 and call data such as calling party ID (i.e., caller ID) from network elements within the IMS core network. The automatic response service 505 can utilize device registration data 520 to determine activity of the device user 105. For example, the service may infer that the user 105 is employing a particular device 110 when it registers for IMS service. In some implementations, the automatic response service can set up a user activity monitor 530 to collect other data from the devices that it may utilize to determine user activities on the devices 110. The activity monitor 530 may be configured to collect the user activity through SIP messaging, or using other communication methods including OTT methods. The automatic response service 505 and/or user activity monitor 530 can interact with a client-side component such as an automatic response client (representatively indicated by reference numeral 545) that is typically instantiated on the devices 110. The automatic response client is described in more detail in FIG. 11 and the accompanying text.

Figure 6:
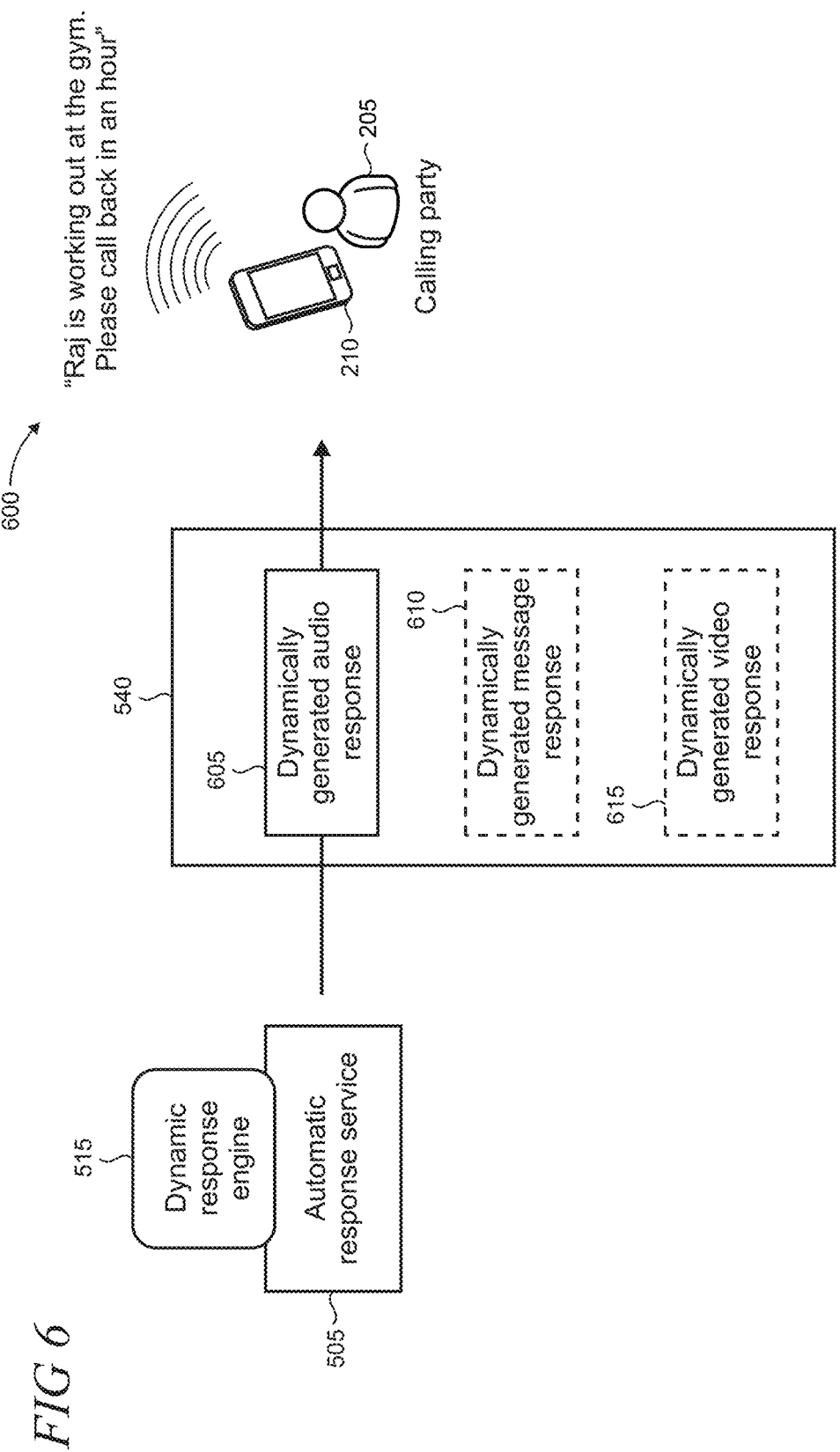
FIG. 6 shows various illustrative types of dynamically generated responses to an incoming call.

The automatic response service 505 includes a dynamic response engine 525. The engine 525 is configured to utilize one or more of device registration data 520, call data 515, and data from the monitor as input data to dynamically generate a response 540 to an incoming call to the user 105 that is placed by the calling party 205. As shown in FIG. 6, the response 540 can include one or more of a dynamically generated audio response 605, message response 610, or video response 615. Combinations of audio, messages, and video may also be utilized in a given response 540. An illustrative response may include an audio announcement 600 that is played by the service 505 within the call audio on the device 210 of the remote party.

Figure 7:
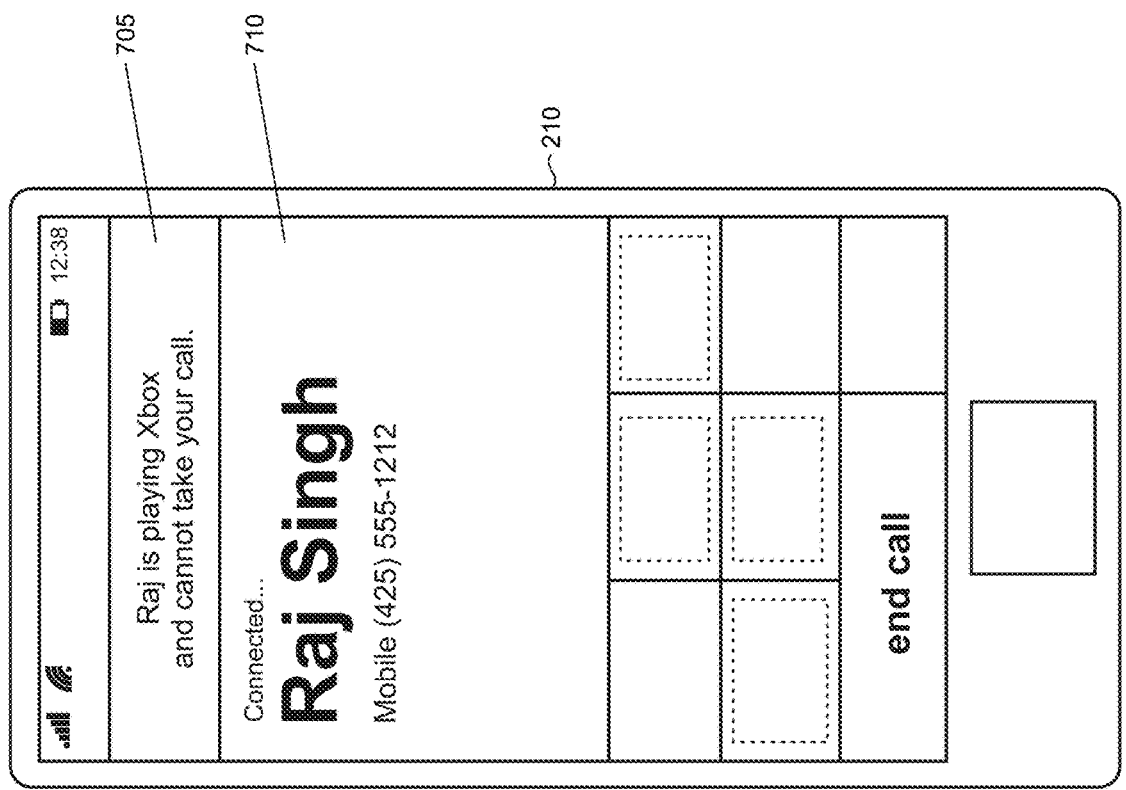
FIG. 7 shows an illustrative message that is surfaced on a calling party's device in response to a call to a called party.

FIG. 7 shows in illustrative message 705 that is surfaced on a graphical user interface (GUI) 710 of a calling party's device 210 in response to an incoming call. The automatic response service 505 uses the available input data to dynamically generate a suitable text-based response that it can direct to the calling party using an IMS service such as RCS, or using an OTT service.

Figure 8:
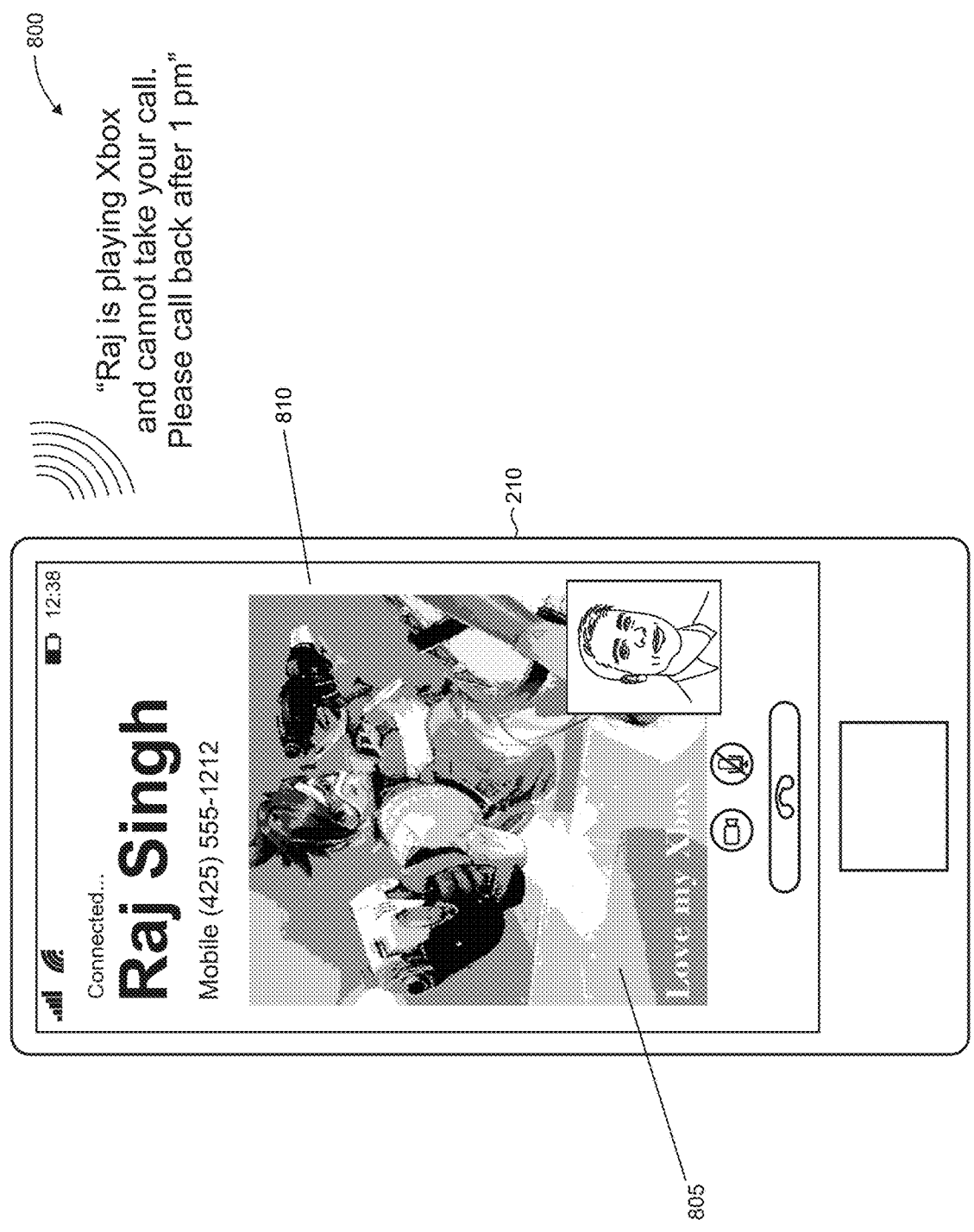
FIG. 8 shows an illustrative video that is surfaced on a calling party's device in response to a call to a called party.

The automatic response service 505 can generate a video response to an incoming call in some cases. For example, if the incoming call is placed as a video call, then the service can dynamically generate and play a suitable response within the video call stream. FIG. 8 shows an illustrative video response that is surfaced on a calling party's device in response to an incoming call. The response includes a video clip 805 rendered on the GUI 810 of the calling party's device 210 and an associated audio announcement 800. In this example, the video clip 805 includes images and content that are contextually-related to the text of the response.

Figure 9:
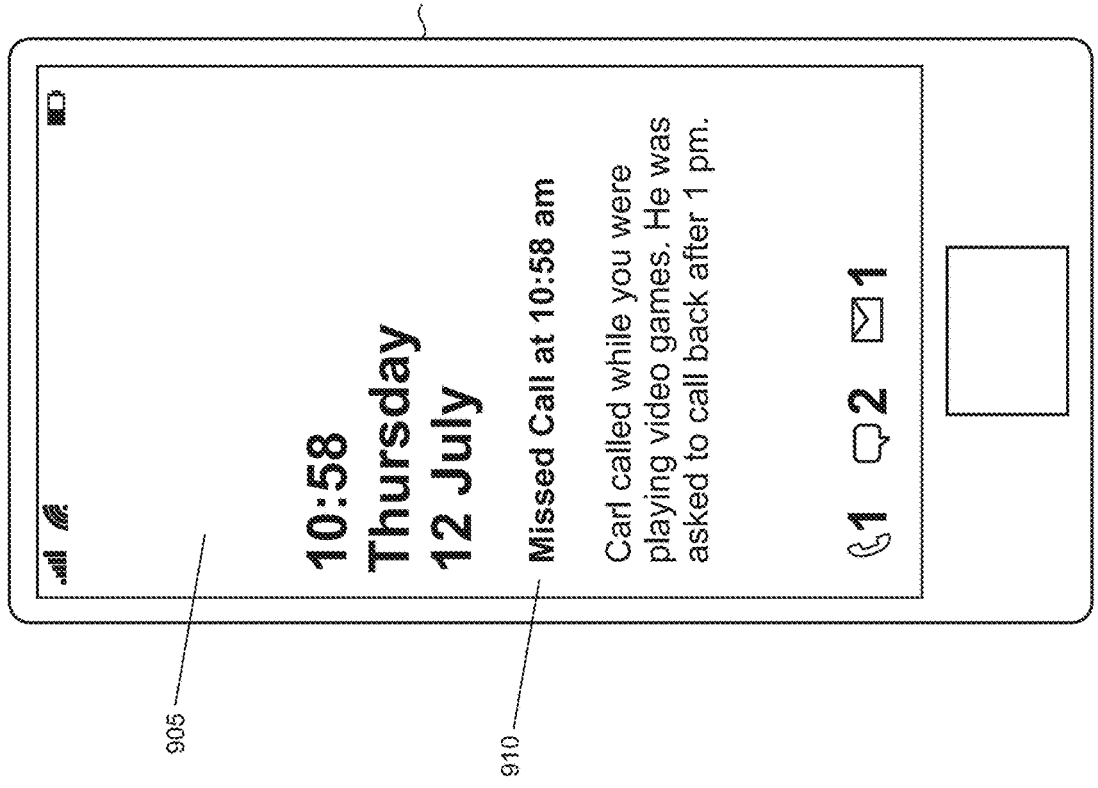
FIG. 9 shows an illustrative notification surfaced on a called party's device in response to a call from a calling party.

Referring again to FIG. 5, the automatic response service 505 can further be configured to provide a notification 535 to a device 110. The notification 535 can pertain to IMS network activities including notifications of missed calls in which a dynamically generated response was provided to the calling party. As shown in FIG. 9, a missed call notification 910 can be surfaced on a GUI 905 of the user's device 110. The notification 910 lets the user know the identity of the calling party, the activity in which the user was engaged at the time of the call, and a synopsis of the response that was provided to the calling party.

Figure 10:
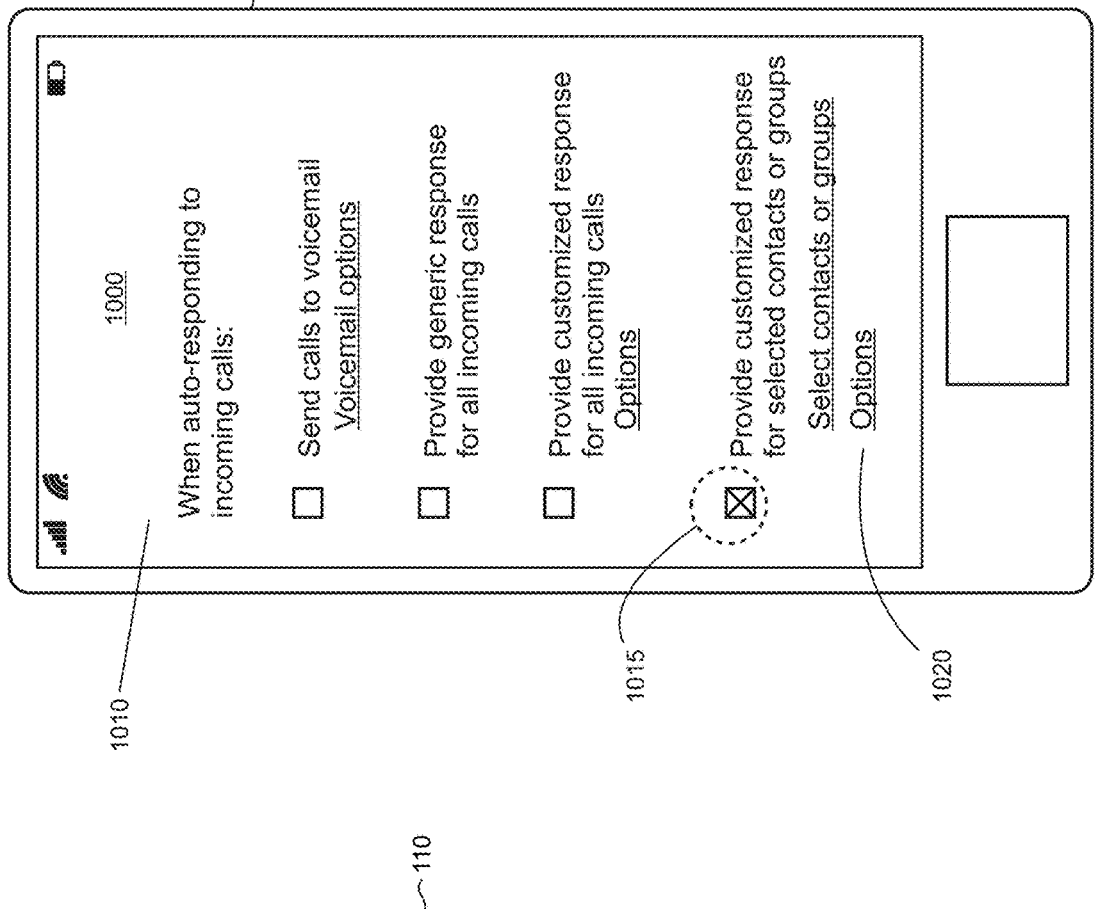
FIG. 10 shows an illustrative user interface for selecting behaviors of the automatic response service.

FIG. 10 shows an illustrative user interface 1000 that is configured to enable the user 105 (FIG. 1) to select behaviors of the automatic response service. The user interface 1000 may be displayed on the GUI 1010 of the user's device 110 to surface various selectable options or enable the user to express preferences. For example, the user may wish to use conventional voice mail to respond to missed calls, provide a customized response (i.e., a response that is generated which provides a response that includes context and information about the user) for some or all incoming calls, or have the system dynamically generate a generic (i.e., non-context-specific) response. For examples, the user may desire that responses that share specific information about her or her activities only be shared with particular known and trusted people such as close friends and family (such persons are referred to here as members of the user's trusted social graph). Other times, the user may wish to distinguish between callers and the responses provided thereto based on group affiliations (e.g., employer, team, club, neighborhood, etc.).

In this example, the user has selected to provide customized responses by manipulation of a control element on the user interface 1000 as indicated by reference numeral 1015. Options may be presented on the user interface 1000, as representatively indicated by reference numeral 1020. The options may include, for example, controls or other functionalities configured to enable a user to select circumstances in which audio responses are provided or when text-based messages are utilized. It is noted that the arrangement of elements on the user interface is illustrative and that the various controllable behaviors of the service, options, and controls provided can vary from what is shown as needed to meet the design requirements of a particular implementation.

Figure 11:
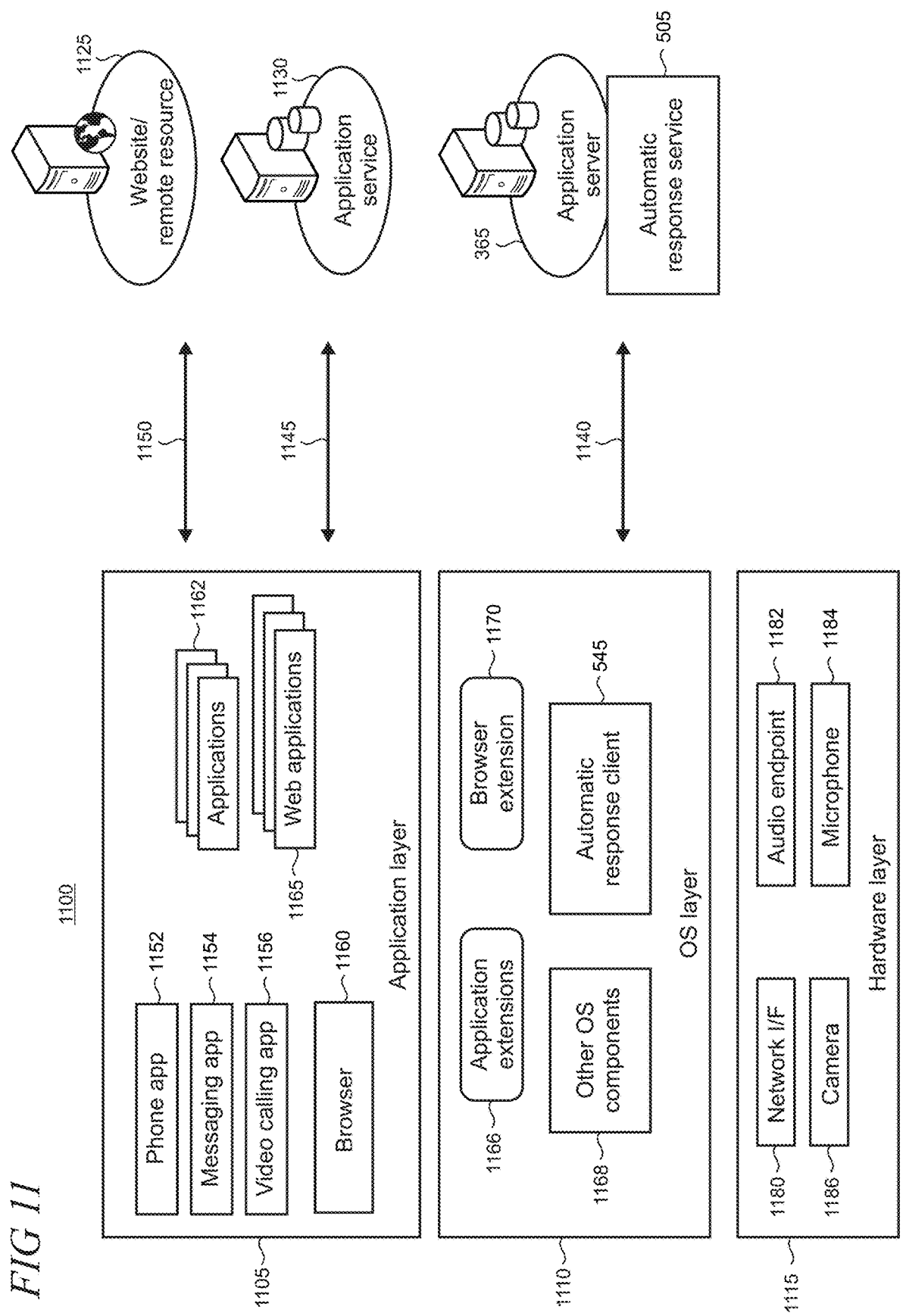
FIG. 11 shows an illustrative layered architecture that may be instantiated on a device that includes an automatic response client.

FIG. 11 shows an illustrative layered architecture 1100 that may be instantiated on a device 110 that includes the automatic response client 545. The automatic response client 545 may be optionally utilized in some implementations to collect additional data that describes user activities with a device 110 and associated context. The automatic response service 505 can utilize the additional data to supplement the input data sources described above in the text accompany FIG. 5. The supplemental data may enable the dynamically generated responses to include more contextually relevant information or achieve a higher degree of customization in some instances. The supplemental data is typically collected only upon notice to the user and user consent to opt-in to the data collection. For example, a suitable user interface can be provided on the device 110 to give the user information about the automatic response service and receive an explicit consent to collect data for the purposes of providing the service.

The architecture 1100 is typically implemented in software, although combinations of software, firmware, and/or hardware may also be utilized in some cases. The architecture 1100 is arranged in layers and includes an application layer 1105, an OS (operating system) layer 1110, and a hardware layer 1115. The hardware layer 1115 provides an abstraction of the various hardware used by the device 110 (e.g., input and output devices, networking and radio hardware, etc.) to the layers above it. In this illustrative example, the hardware layer supports network interfaces (as representatively indicated by reference numeral 1180), camera 1186, and an audio endpoint 1182 which may include, for example, the device's internal speaker, a wired or wireless headset/earpiece, external speaker/device, and the like which the user can employ to hear audio responses that are dynamically generated by the automatic response service 505 (FIG. 5).

The application layer 1105 in this illustrative example supports a browser 1160 and various applications 1162 and web applications 1165 (productivity, social, entertainment, news and information applications, etc.). The application layer further includes applications including phone, messaging, and video calling applications, as respectively indicated by reference numerals 1152, 1154, and 1156. The browser and each of the applications in the layer may be configured to expose an extensibility functionality through respective application extensions 1166 and a browser extension 1170 such as an API (application programming interface), or other suitable components to facilitate interactions with the automatic response client 545 and other components 1168 in the OS layer 1110.

For example, the extensibility functionality may enable the automatic response client 545 to access an email application to examine the user's emails to identify context that may help to provide additional customization for a dynamically generated response. The applications are often implemented using locally executing code. However, in some cases, these applications can rely on services and/or remote code execution provided by remote servers or other computing platforms such as those supported by an application service provider 1130 or other cloud-based websites and/or resources 1125, respectively indicated by lines 1145 and 1150.

The OS layer 1110 supports the automatic response client 545, the application extensions 1166, the browser extension 1170, and various other OS components 1168. In alternative implementations, automatic response client 545, the application extensions 1166, and the browser extension 1170 can be optionally instantiated as components in the application layer 1105. In typical implementations, automatic response client 545 can interact with the automatic response service 505, as indicated by line 1140. That is, the automatic response client, in some implementations, can partially utilize or fully utilize remote code execution supported at the service 505, or using other remote resources. In addition, it may utilize and/or interact with the other OS components 1168 (and/or other components that are instantiated in the other layers of the architecture 1100) as may be needed to implement the various features and functions described herein. In some implementations, some or all of the functionalities supported by one or more of the automatic response client 545, the application extensions 1166, and/or the browser extension 1170 can be incorporated in the device operating system and/or firmware and the particular division of functionality between the components can be selected as a matter of design choice.

The automatic response client 545 may be configured to collect applicable user activity and contextual data using a context monitor 1210. The context monitor can be configured to interact with one or more different data sources and/or types including user interactions with applications and websites (as indicated by reference numeral 1215); application data such as emails, calendars, schedules, to do lists, contacts lists (1220); location data (1225); device sensor data (1230); biometric data (1235) which may be obtained, for example, using the accessory device 116 shown in FIG. 1 and described in the accompanying text; and data describing user preferences for application and device behaviors (1240).

The sources monitored by the context monitor 1210 can be used alone or in various combinations with other input data to enable the automatic response service 505 to utilize contextual data 1205 when it operates. Contextual data is data that provides relevant context about a person (e.g., the user, the calling party), an entity (e.g., one or more devices), or event and can be collected using a sensor package on a device that is configured to sense and analyze data about the user or device environmental surrounding. Sensors in the sensor package may include, for example, camera, accelerometer, location-awareness component, thermometer, altimeter, heart rate sensor, barometer, microphone, or proximity sensor, as described in more detail in the text below accompanying FIGS. 24 and 25. Contextual data can also be collected from stored data that is associated with a person, entity, or event.

Contextual data can include, for example, time/date, the user's location, speed, acceleration, and/or direction of travel, environmental conditions (e.g., altitude, temperature, barometric pressure), user's physiological state, language, schedule, applications installed on the device, the user's preferences, the user's behaviors (in which such behaviors may be monitored/tracked with notice to the user and the user's consent), stored contacts (including, in some cases, links to a local user's or remote user's social graph such as those maintained by external social networking services), call history, messaging history, browsing history, device type, device capabilities, communication network type and/or features/functionalities provided therein, mobile data plan restrictions/limitations, data associated with other parties to a communication (e.g., their schedules, preferences, etc.), and the like.

Figure 13:
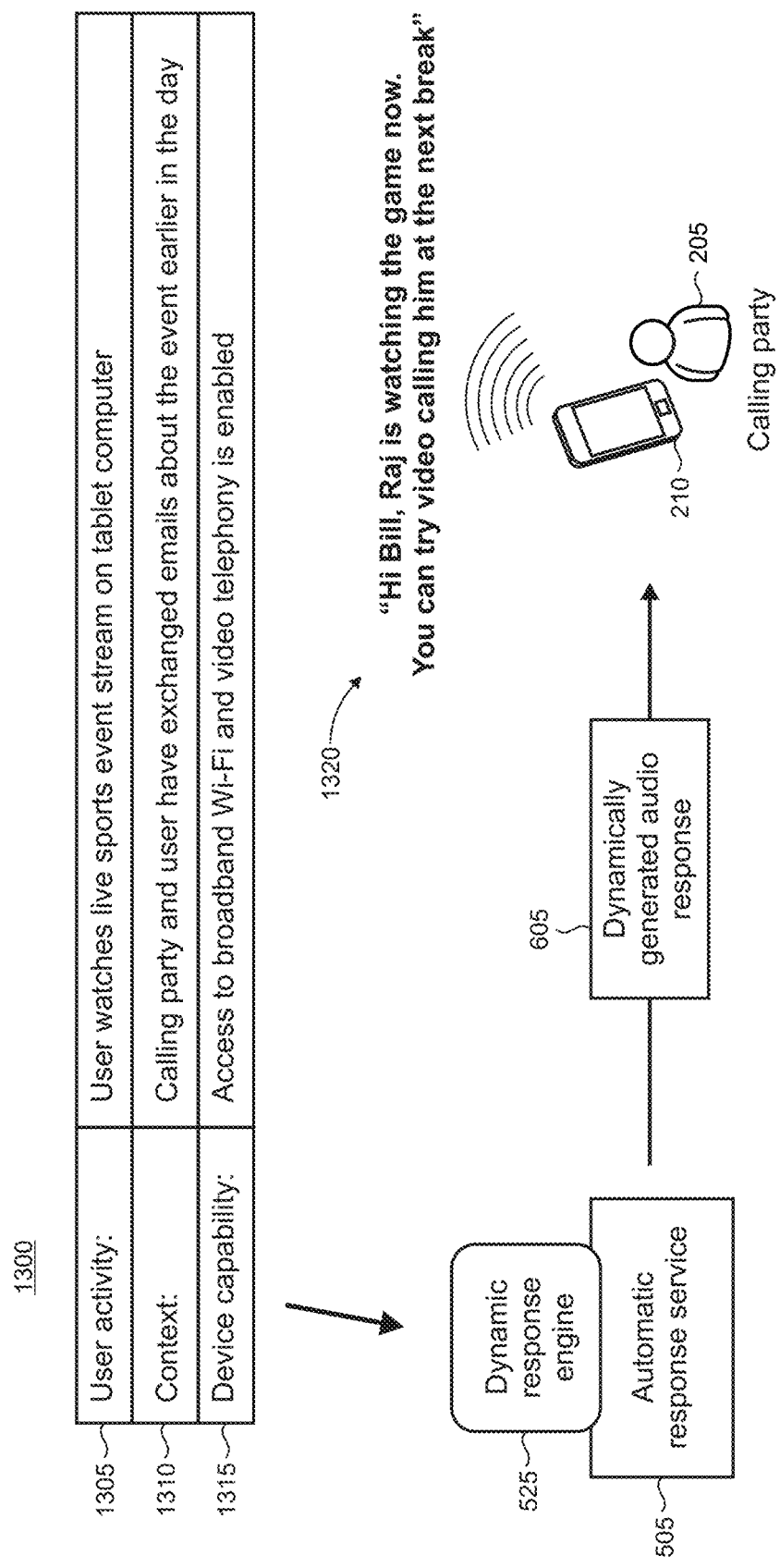
FIGS. 13-18 show illustrative dynamically and automatically generated responses in different use scenarios.

Turning now to a presentation of illustrative examples of use scenarios, FIG. 13 shows illustrative inputs 1300 to the dynamic response engine 525 supported by the automatic response service 505 when an incoming call is received for the user's device. The inputs include user activity 1305, context 1310, and device capability 1315. In this and in each of the use scenarios described below in the text accompany FIGS. 14-18, the automatic response service 505 produces a dynamically generated audio response. However, it may be appreciated that other forms of responses including text and videos, or combinations of audio, and video may also be utilized in the illustrative use scenarios.

Figure 12:
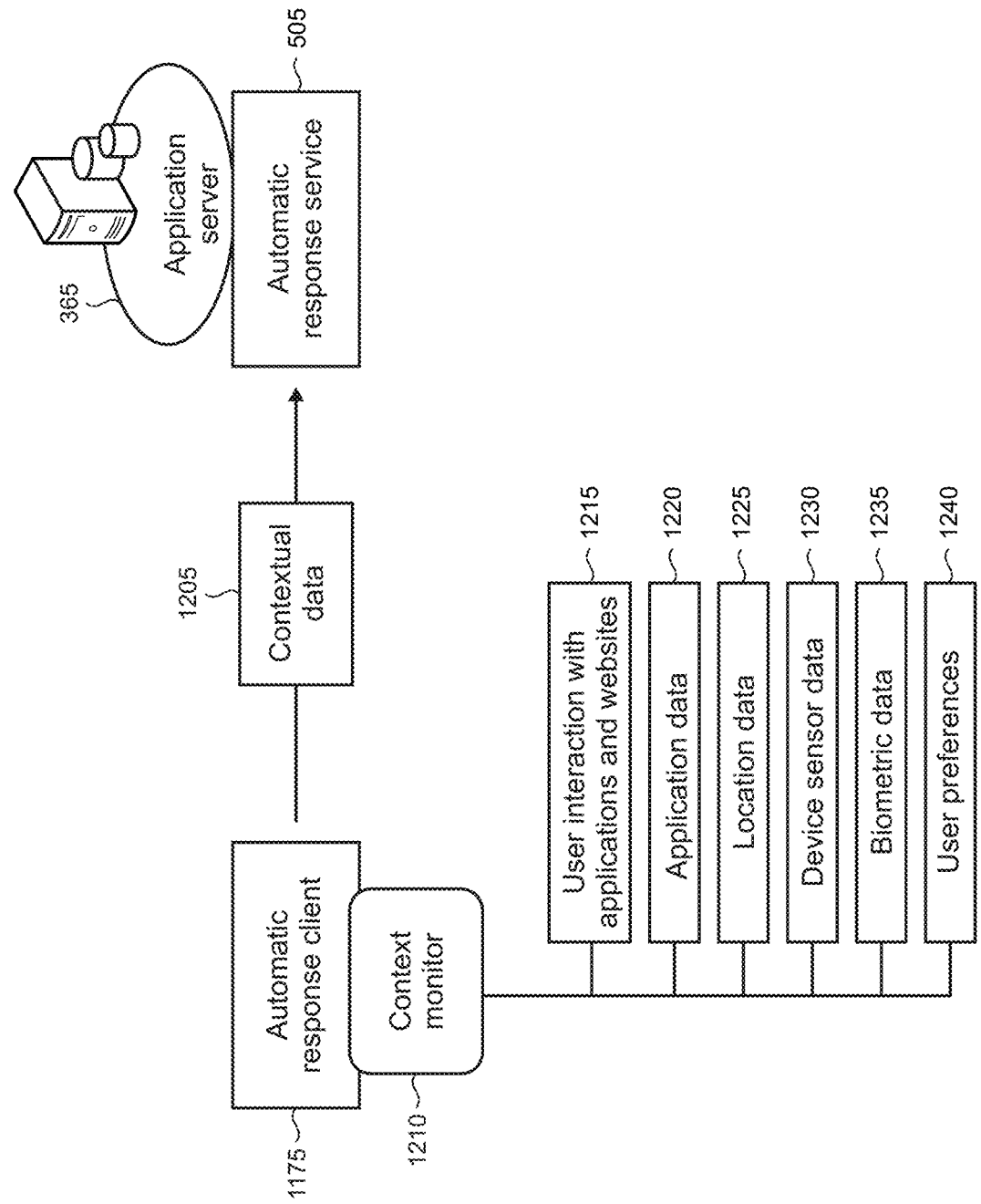
FIG. 12 shows context monitoring that may be performed by an automatic response client on a device.

In this use scenario, the user is watching a live stream of an event on his tablet computer which is registered for IMS services with the IMS core network. The user and the calling party have exchanged emails about the event earlier that day for which the context monitor 1210 (FIG. 12) has knowledge. The tablet computer is equipped for video calls and has access to broadband Wi-Fi. Using these inputs, the dynamic response engine 525 produces customized response to the calling party 205 which the automatic response service 505 delivers to the calling party using audio on the call. The response 1320 addresses the calling party 205 by name by comparing the caller ID from the IMS core network against the user's contact list in application data. The response further expresses the user's current activity and suggests a video call be placed later. Alternatively, the user may share the live stream with the calling party using RCS or other suitable service so that they can both enjoy the event together.

Figure 14:
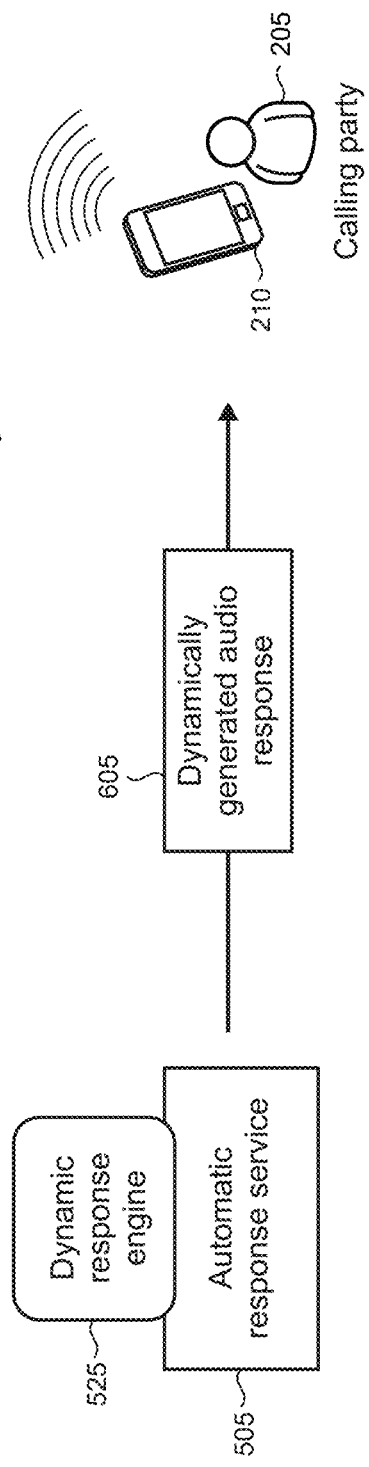

FIG. 14 shows illustrative inputs 1400 to the dynamic response engine 525 supported by the automatic response service 505 when an incoming call is received for the user's device. The user activity 1405 includes the user on a subway train with his device having registered for IMS services but not being used. Context 1410 includes identifying the calling party as work colleague of a user. Context further includes the context monitor 1210 (FIG. 12) having knowledge of the user's scheduling application data which shows an upcoming appointment for a sales meeting.

Device capability 1415 indicates a device state in which only a cellular network connection is available which is intermittent with low quality of service (QoS) because of the user and device being on a moving subway train. The dynamic response engine 525 uses the available inputs 1400 to dynamically generate a response 1420 which addresses the colleague by name, indicates the user's current whereabouts and plans, and provides a suggestion for reaching the user that is expected to be satisfactory with the user's current network conditions.

Figure 15:
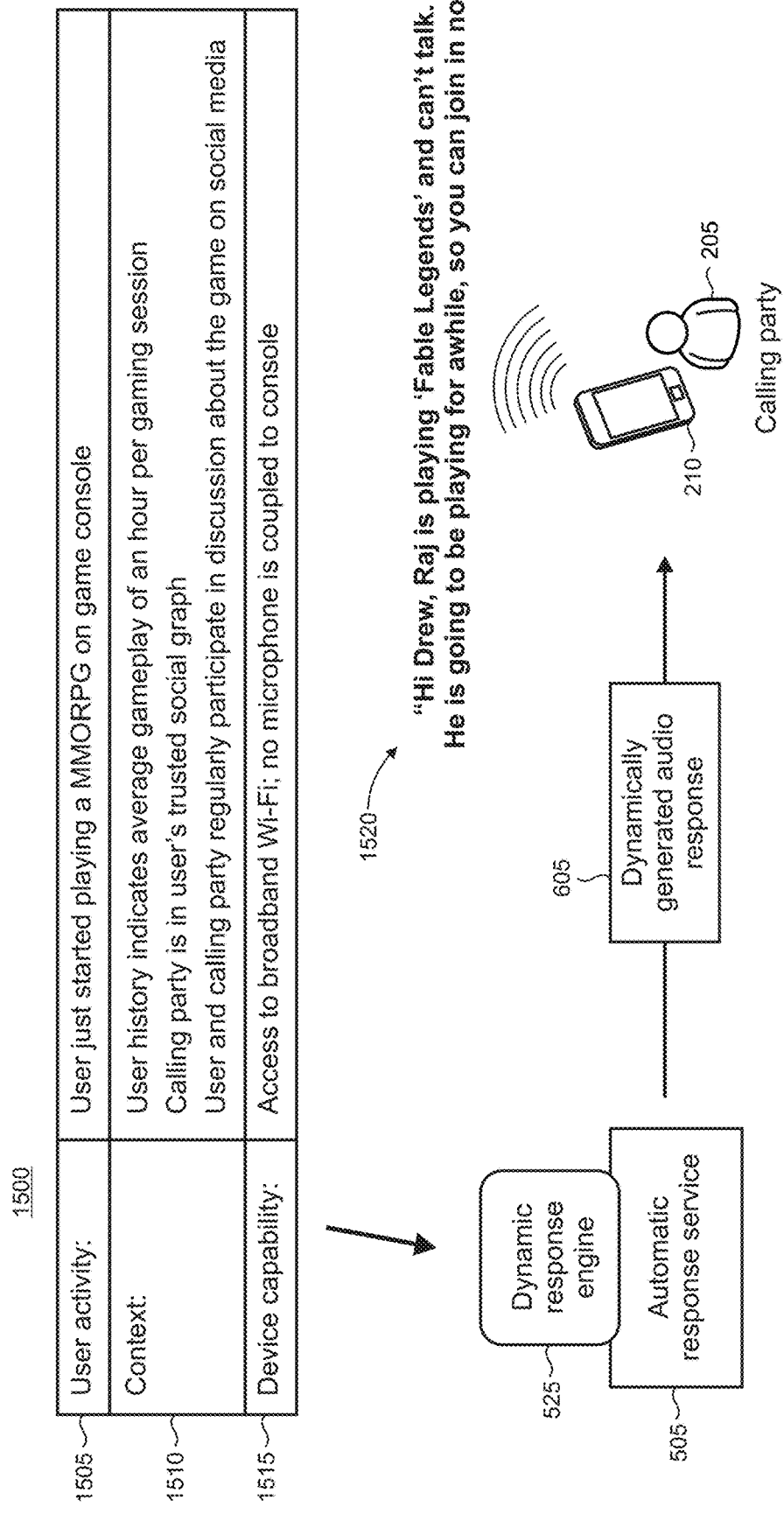

FIG. 15 shows illustrative inputs 1500 to the dynamic response engine 525 supported by the automatic response service 505 when an incoming call is received for the user's device. The user activity 1505 in this example includes the user just having started with a massive multiplayer online role playing game (MMORPG) on his multimedia console which is registered for IMS services. The context 1510 includes a user history, as determined by the automatic response client 545 (FIG. 5), that indicates that the user typically plays the MMORPG around an hour per gaming session. In addition, the automatic response client can determine that the calling party is in the user's trusted social graph, and that the user and calling party regularly use social media to discuss the MMORPG game.

Device capability 1515 indicates that the multimedia console is not currently equipped with a microphone and has access to broadband Wi-Fi. The dynamic response engine 525 uses the available inputs 1500 to dynamically generate a response 1520 which addresses the caller by name, indicates the user's current activity, and invites the caller to join in on the game based on the user's history of playing for an hour per game session.

Figure 16:
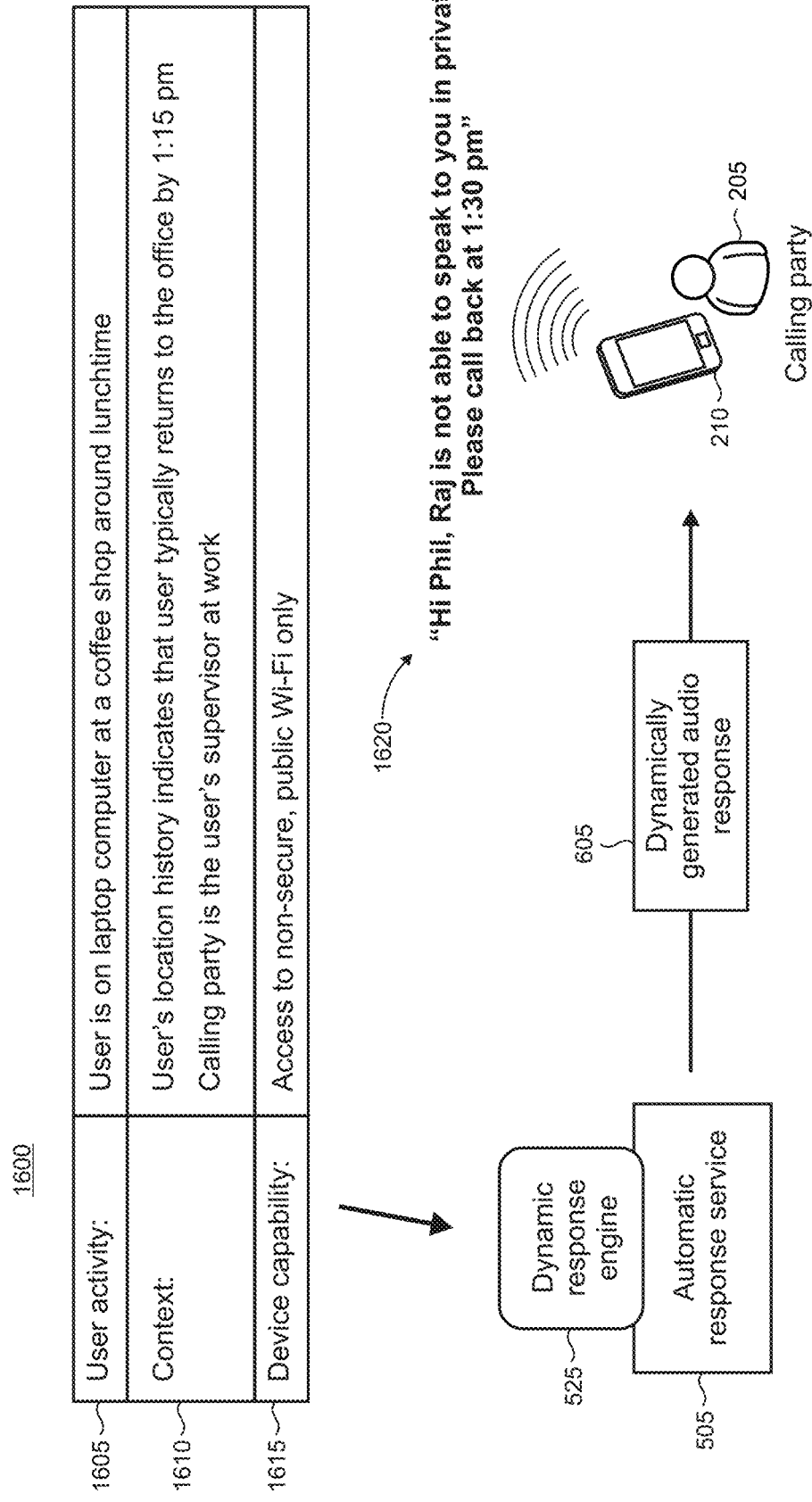

FIG. 16 shows illustrative inputs 1600 to the dynamic response engine 525 supported by the automatic response service 505. The user activity 1605 includes the user working on a laptop computer around lunchtime at a coffee shop. The laptop computer is registered for IMS services. Context 1610 includes a location history for the user, as determined by the automatic response client 545 (FIG. 11), that indicates that the user typically returns to his office around the same time each day. In addition, the automatic response client can determine that the calling party is the user's work supervisor.

Device capability 1615 indicates that the laptop computer has access only to a non-secure public Wi-Fi (e.g., a hot spot). The dynamic response engine 525 uses the available inputs 1600 to dynamically generate a response 1620 which addresses the caller by name, informs the caller about the non-secure conditions, and invites the caller to call back at a time when the user is predicted to be available under appropriate conditions to take a private call.

Figure 17:
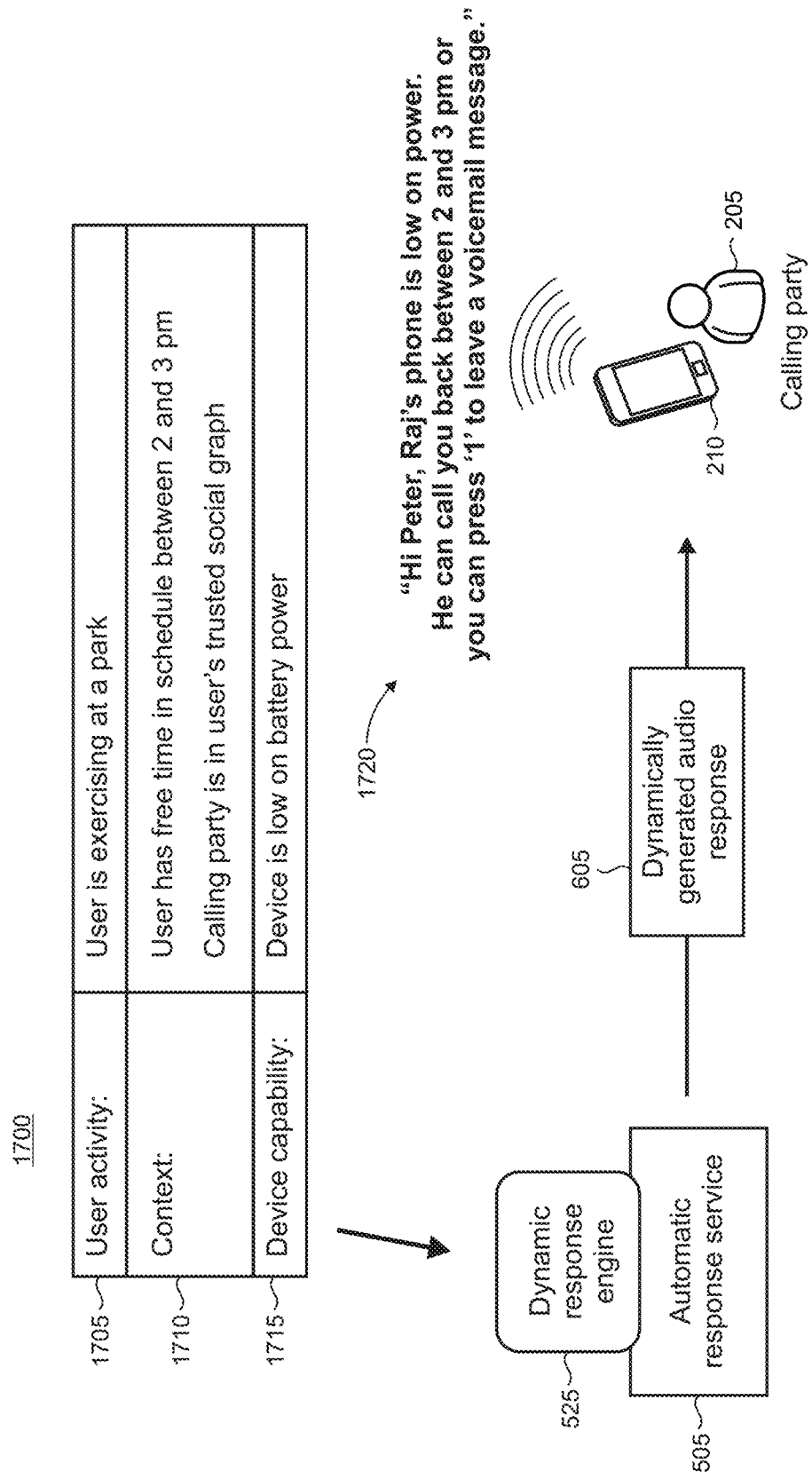

FIG. 17 shows illustrative inputs 1700 to the dynamic response engine 525 supported by the automatic response service 505 when an incoming call is received for the user's device. The user activity 1705 includes the user exercising at a park with his smart phone being registered for IMS services. Context 1710 includes the automatic response client 545 (FIG. 5) determining from the user's scheduling application data that the user has free time later that day. The automatic response client can further determine that the calling party is in the user's trusted social graph.

Device capability 1715 indicates a device state in which the smartphone is low on battery power. The dynamic response engine 525 uses the available inputs 1700 to dynamically generate a response 1720 which addresses the caller by name, informs the caller about the low power status, and an informs the caller of a time window when he can expect a return call. The response 1720, in this example, invites the caller to leave a voicemail message.

Figure 18:
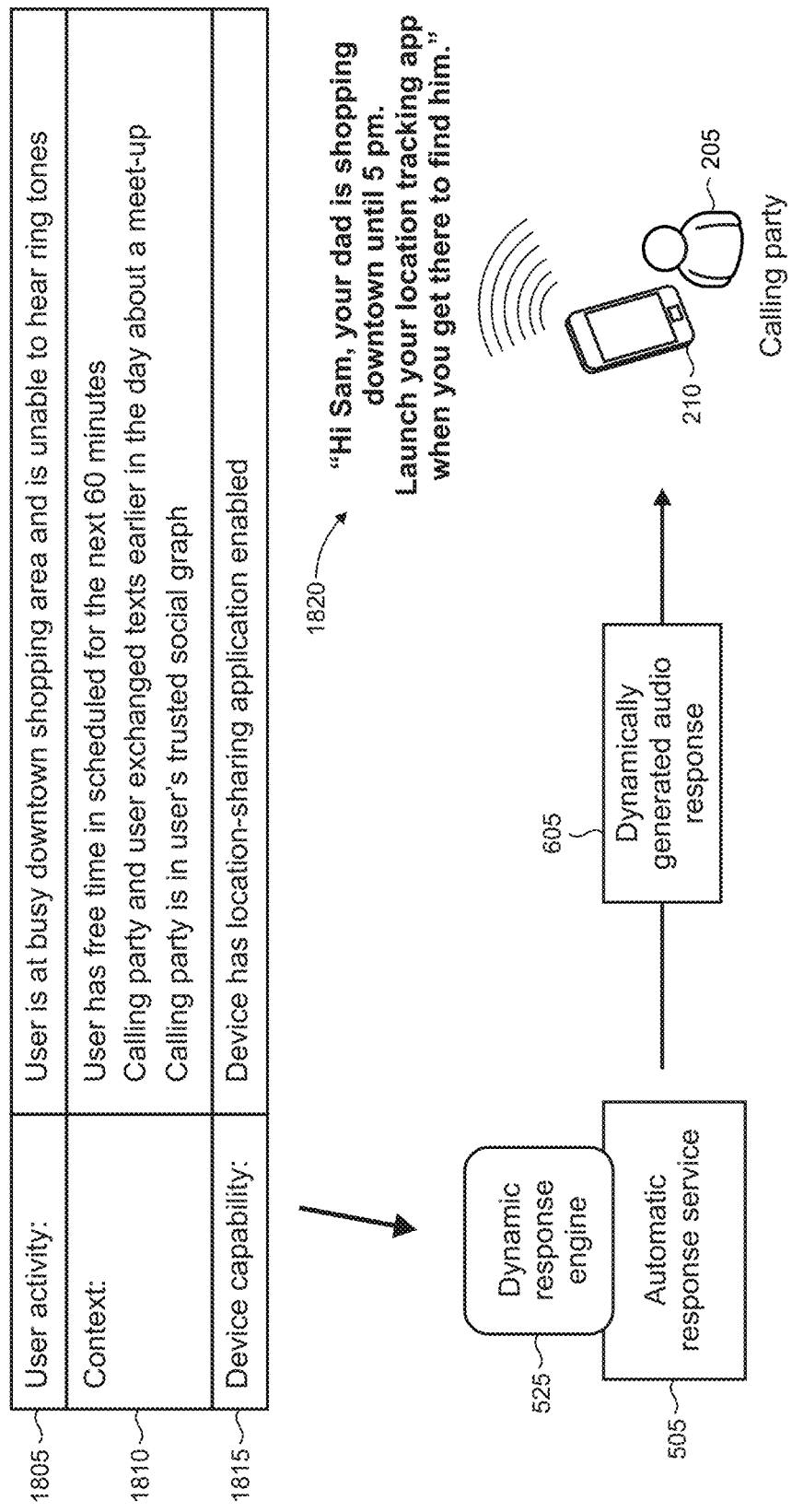

FIG. 18 shows illustrative inputs 1800 to the dynamic response engine 525 supported by the automatic response service 505. The user activity 1805 in this example includes the user being at a busy downtown shopping area where he is unable to hear device ring tones on his mobile phone. The mobile phone is registered for IMS services. Context 1810 includes the automatic response client 545 (FIG. 5) determining from the user's scheduling application data that the user is likely to be shopping for the next hour. In addition, the automatic response client has monitored text messages between the calling party and the user from earlier that day which indicate a planned meet-up. Calling party is in the user's trusted social graph.

Device capability 1815 indicates that the user mobile phone includes a location-sharing application which is enabled. The dynamic response engine 525 the available inputs 1800 to dynamically generate a response 1820 which addresses the calling party by name, informs the caller of the user's general location and time window, and suggest a particular course of action to help the caller locate the user.

Figure 19:
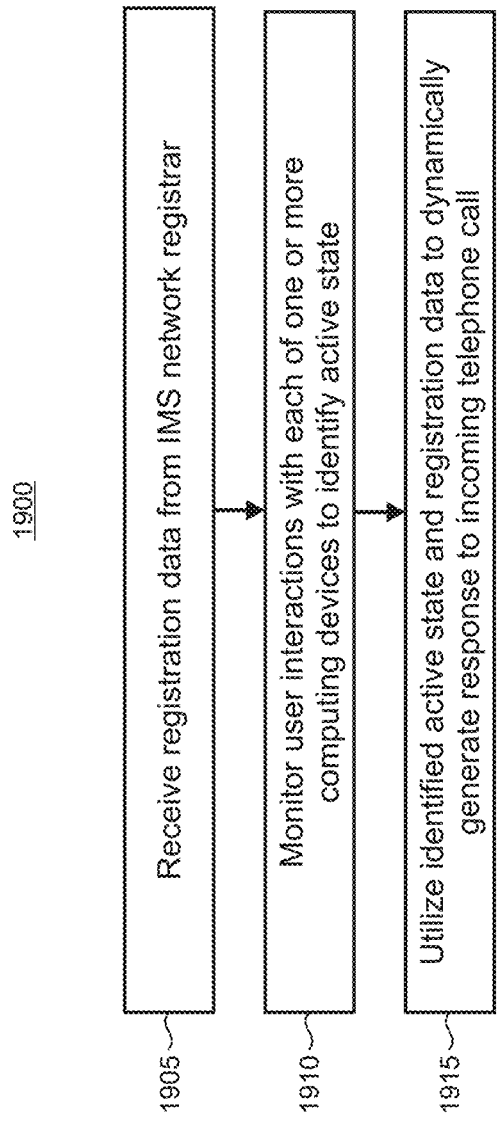
FIGS. 19-21 show illustrative methods that may be performed when implementing the present automatic responses to incoming calls based on user activity.

FIG. 19 is a flowchart of an illustrative method 1900 for automatically generating a response to incoming telephone calls to one or more computing devices in which the calls are carried over an IMS network. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1905, registration data is received from a registrar and an IMS network. The data describes registrations of one or more computing devices to receive IMS network services. In step 1910, user interactions with each of the one or more computing devices are monitored to identify an active state of each of the one or more computing devices. In step 1915, the identified active state and registration data is utilized to dynamically generate a response to an incoming telephone call.

Figure 20:
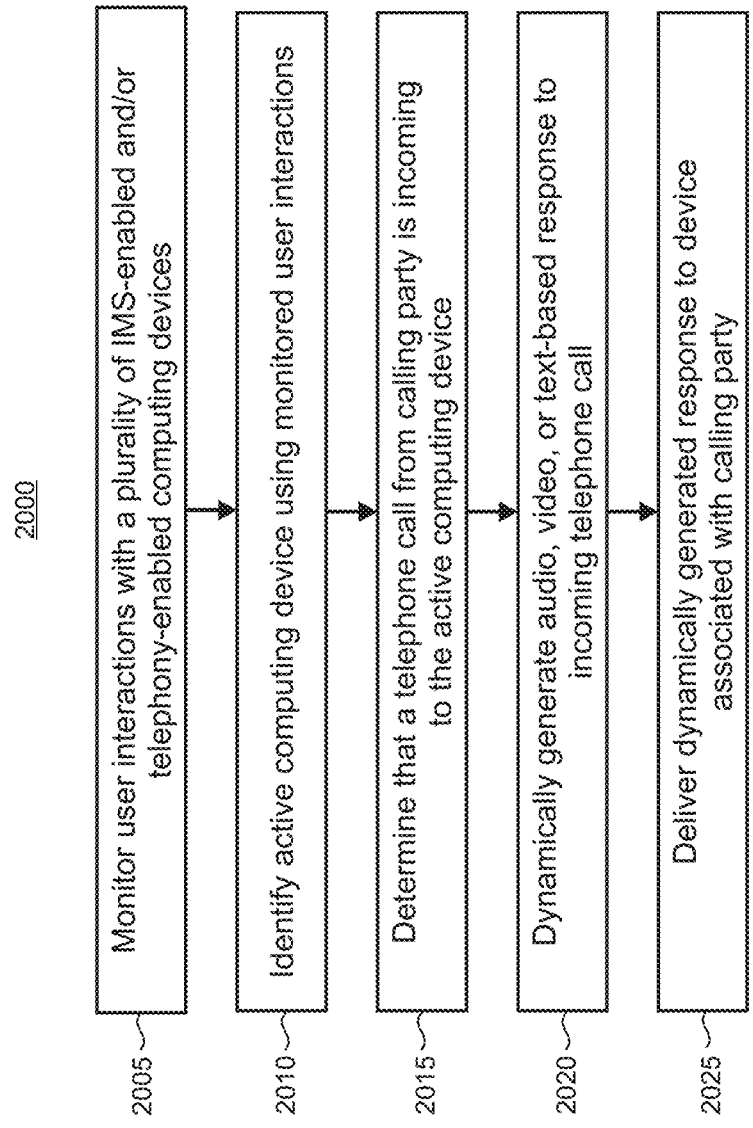

FIG. 20 is a flowchart of an illustrative method 2000 that may be performed by a computer server such as one used as an application server in an IMS core network. In step 2005, user interactions with the plurality of IMS-enabled or telephony-enabled computing devices are monitored. In step 2010, the monitor interactions are utilized to identify active computing device. In step 2015 a determination is made that a telephone call from a calling party is incoming to the active computing device. In step 2020 and audio, video, or text-based response to the incoming telephone call is dynamically generated using the received data. In step 2025, the dynamically generated response to the incoming telephone call is delivered is delivered to a device associated with the calling party.

Figure 21:
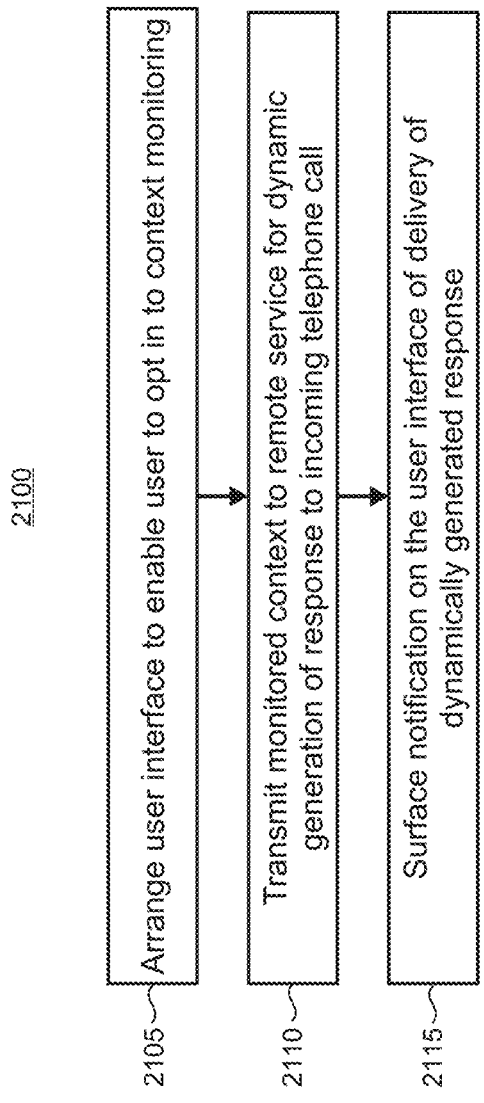
Figure 22:
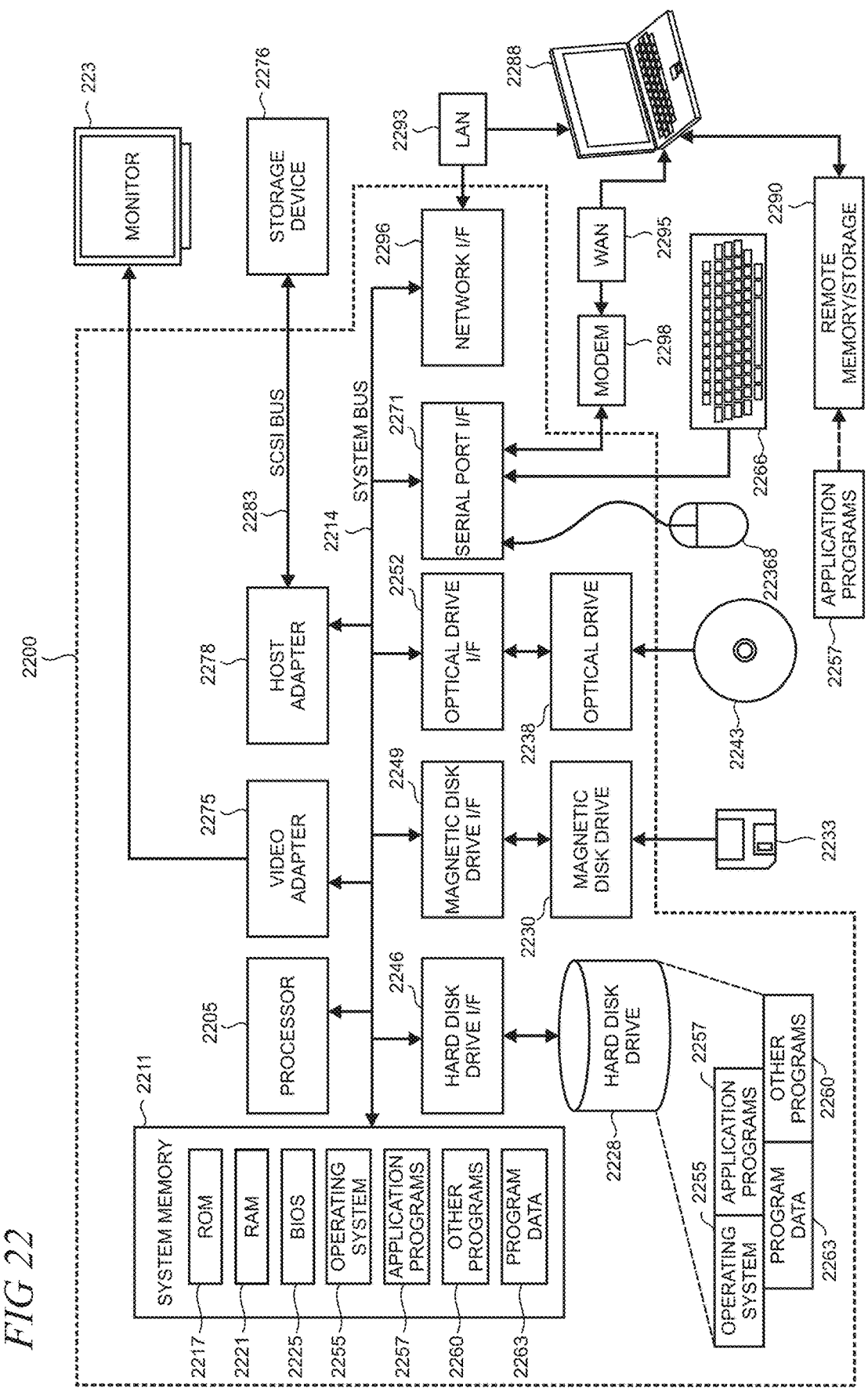
FIG. 22 is a simplified block diagram of an illustrative computer system such as a personal computer (PC) that may be used in part to implement the present automatic responses to incoming calls based on user activity.

FIG. 21 is a flowchart of an illustrative method 2100 that may be performed by a device 110 (FIG. 1). In step 2105 a user interface is arranged to enable a user to opt in to monitoring of context. The context may be associated with the device or the device user and describes an operational state of the device or user activities when interacting with the device. In step 2110, the monitored context transmitted to a remote service so that the remote service can use the monitored context to dynamically generate a response to an unanswered incoming phone call, and deliver the dynamically generated response to the caller's device. In step 2115, a notification is surfaced on the user interface of the delivery of the dynamically generated response the incoming telephone call FIG. 22 is a simplified block diagram of an illustrative computer system 2200 such as a PC, client machine, or server with which the present task automation using location-awareness of multiple devices may be implemented. Computer system 2200 includes a processor 2205, a system memory 2211, and a system bus 2214 that couples various system components including the system memory 2211 to the processor 2205. The system bus 2214 may be any of several types of bus structures including a memory bus or memory controller, a peripheral bus, or a local bus using any of a variety of bus architectures. The system memory 2211 includes read only memory (ROM) 2217 and random access memory (RAM) 2221. A basic input/output system (BIOS) 2225, containing the basic routines that help to transfer information between elements within the computer system 2200, such as during startup, is stored in ROM 2217. The computer system 2200 may further include a hard disk drive 2228 for reading from and writing to an internally disposed hard disk (not shown), a magnetic disk drive 2230 for reading from or writing to a removable magnetic disk 2233 (e.g., a floppy disk), and an optical disk drive 2238 for reading from or writing to a removable optical disk 2243 such as a CD (compact disc), DVD (digital versatile disc), or other optical media. The hard disk drive 2228, magnetic disk drive 2230, and optical disk drive 2238 are connected to the system bus 2214 by a hard disk drive interface 2246, a magnetic disk drive interface 2249, and an optical drive interface 2252, respectively. The drives and their associated computer-readable storage media provide non-volatile storage of computer-readable instructions, data structures, program modules, and other data for the computer system 2200. Although this illustrative example includes a hard disk, a removable magnetic disk 2233, and a removable optical disk 2243, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present task automation using location-awareness of multiple devices. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 2233, optical disk 2243, ROM 2217, or RAM 2221, including an operating system 2255, one or more application programs 2257, other program modules 2260, and program data 2263. A user may enter commands and information into the computer system 2200 through input devices such as a keyboard 2266 and pointing device 2268 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2205 through a serial port interface 2271 that is coupled to the system bus 2214, but may be connected by other interfaces, such as a parallel port, game port, or universal serial bus (USB). A monitor 2273 or other type of display device is also connected to the system bus 2214 via an interface, such as a video adapter 2275. In addition to the monitor 2273, personal computers typically include other peripheral output devices (not shown), such as speakers and printers. The illustrative example shown in FIG. 22 also includes a host adapter 2278, a Small Computer System Interface (SCSI) bus 2283, and an external storage device 2276 connected to the SCSI bus 2283.

The computer system 2200 is operable in a networked environment using logical connections to one or more remote computers, such as a remote computer 2288. The remote computer 2288 may be selected as another personal computer, a server, a router, a network PC, a peer device, or other common network node, and typically includes many or all of the elements described above relative to the computer system 2200, although only a single representative remote memory/storage device 2290 is shown in FIG. 22. The logical connections depicted in FIG. 22 include a local area network (LAN) 2293 and a wide area network (WAN) 2295. Such networking environments are often deployed, for example, in offices, enterprise-wide computer networks, intranets, and the Internet.

When used in a LAN networking environment, the computer system 2200 is connected to the local area network 2293 through a network interface or adapter 2296. When used in a WAN networking environment, the computer system 2200 typically includes a broadband modem 2298, network gateway, or other means for establishing communications over the wide area network 2295, such as the Internet. The broadband modem 2298, which may be internal or external, is connected to the system bus 2214 via a serial port interface 2271. In a networked environment, program modules related to the computer system 2200, or portions thereof, may be stored in the remote memory storage device 2290. It is noted that the network connections shown in FIG. 22 are illustrative and other means of establishing a communications link between the computers may be used depending on the specific requirements of an application of the present task automation using location-awareness of multiple devices.

Figure 23:
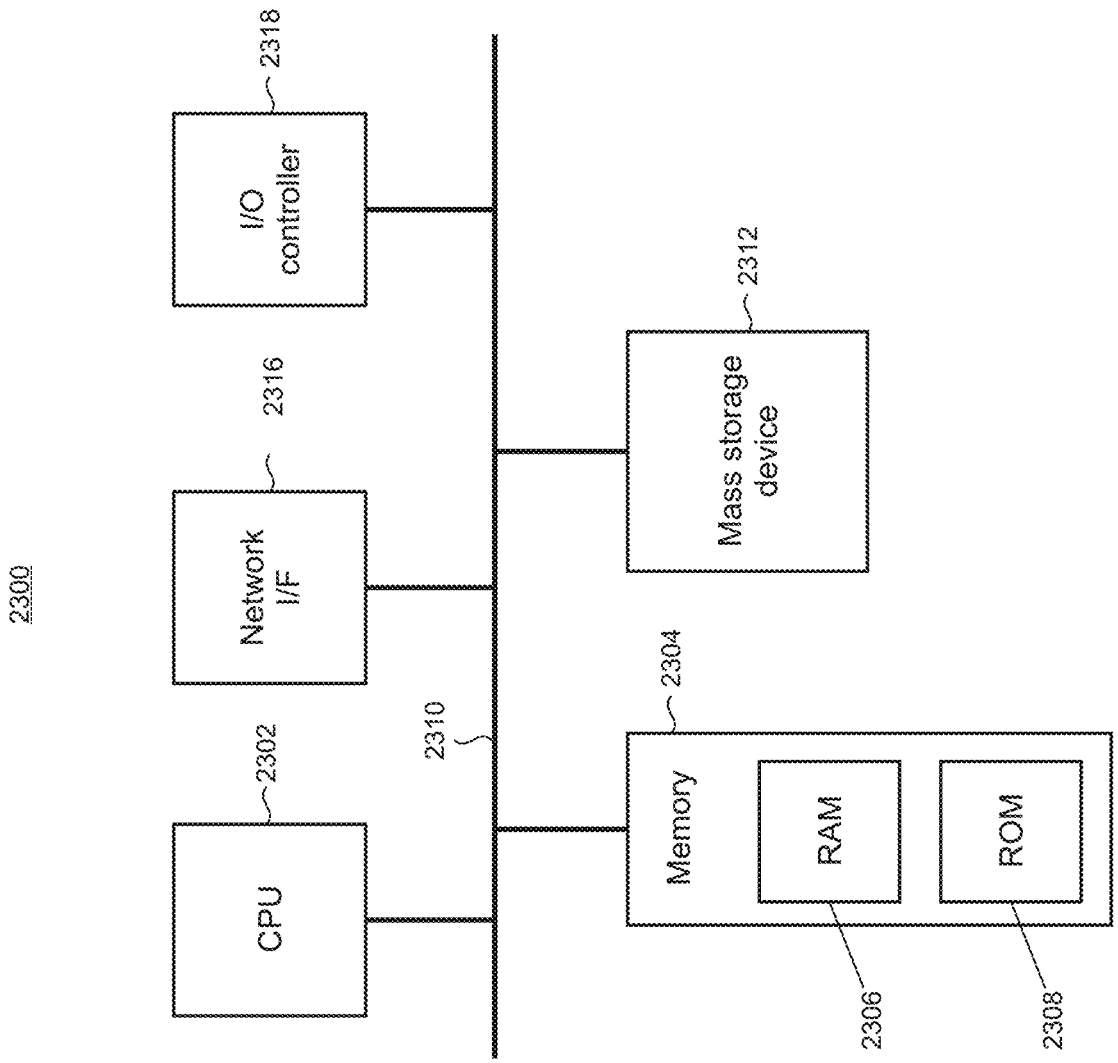
FIG. 23 shows a block diagram of an illustrative device that may be used in part to implement the present automatic responses to incoming calls based on user activity.

FIG. 23 shows an illustrative architecture 2300 for a device capable of executing the various components described herein for providing the present task automation using location-awareness of multiple devices. Thus, the architecture 2300 illustrated in FIG. 23 shows an architecture that may be adapted for a server computer, mobile phone, a PDA, a smartphone, a desktop computer, a netbook computer, a tablet computer, GPS device, gaming console, and/or a laptop computer. The architecture 2300 may be utilized to execute any aspect of the components presented herein.

The architecture 2300 illustrated in FIG. 23 includes a CPU (Central Processing Unit) 2302, a system memory 2304, including a RAM 2306 and a ROM 2308, and a system bus 2310 that couples the memory 2304 to the CPU 2302. A basic input/output system containing the basic routines that help to transfer information between elements within the architecture 2300, such as during startup, is stored in the ROM 2308. The architecture 2300 further includes a mass storage device 2312 for storing software code or other computer-executed code that is utilized to implement applications, the file system, and the operating system.

The mass storage device 2312 is connected to the CPU 2302 through a mass storage controller (not shown) connected to the bus 2310. The mass storage device 2312 and its associated computer-readable storage media provide non-volatile storage for the architecture 2300.

Although the description of computer-readable storage media contained herein refers to a mass storage device, such as a hard disk or CD-ROM drive, it may be appreciated by those skilled in the art that computer-readable storage media can be any available storage media that can be accessed by the architecture 2300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2300.

According to various embodiments, the architecture 2300 may operate in a networked environment using logical connections to remote computers through a network. The architecture 2300 may connect to the network through a network interface unit 2316 connected to the bus 2310. It may be appreciated that the network interface unit 2316 also may be utilized to connect to other types of networks and remote computer systems. The architecture 2300 also may include an input/output controller 2318 for receiving and processing input from a number of other devices, including a keyboard, mouse, or electronic stylus (not shown in FIG. 23). Similarly, the input/output controller 2318 may provide output to a display screen, a printer, or other type of output device (also not shown in FIG. 23).

It may be appreciated that the software components described herein may, when loaded into the CPU 2302 and executed, transform the CPU 2302 and the overall architecture 2300 from a general-purpose computing system into a special-purpose computing system customized to facilitate the functionality presented herein. The CPU 2302 may be constructed from any number of transistors or other discrete circuit elements, which may individually or collectively assume any number of states. More specifically, the CPU 2302 may operate as a finite-state machine, in response to executable instructions contained within the software modules disclosed herein. These computer-executable instructions may transform the CPU 2302 by specifying how the CPU 2302 transitions between states, thereby transforming the transistors or other discrete hardware elements constituting the CPU 2302.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2300 in order to store and execute the software components presented herein. It also may be appreciated that the architecture 2300 may include other types of computing devices, including handheld computers, embedded computer systems, smartphones, PDAs, and other types of computing devices known to those skilled in the art. It is also contemplated that the architecture 2300 may not include all of the components shown in FIG. 23, may include other components that are not explicitly shown in FIG. 23, or may utilize an architecture completely different from that shown in FIG. 23.

Figure 24:
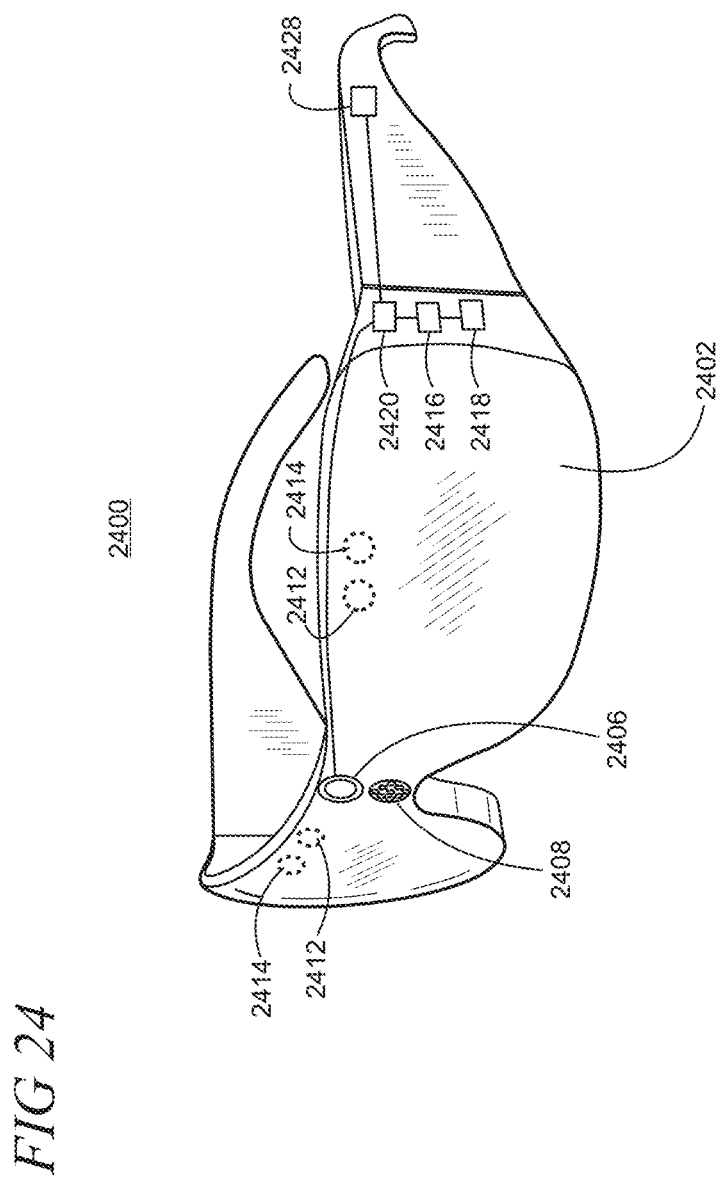
FIG. 24 is a pictorial view of an illustrative example of a wearable virtual reality or mixed reality HMD device.
Figure 25:
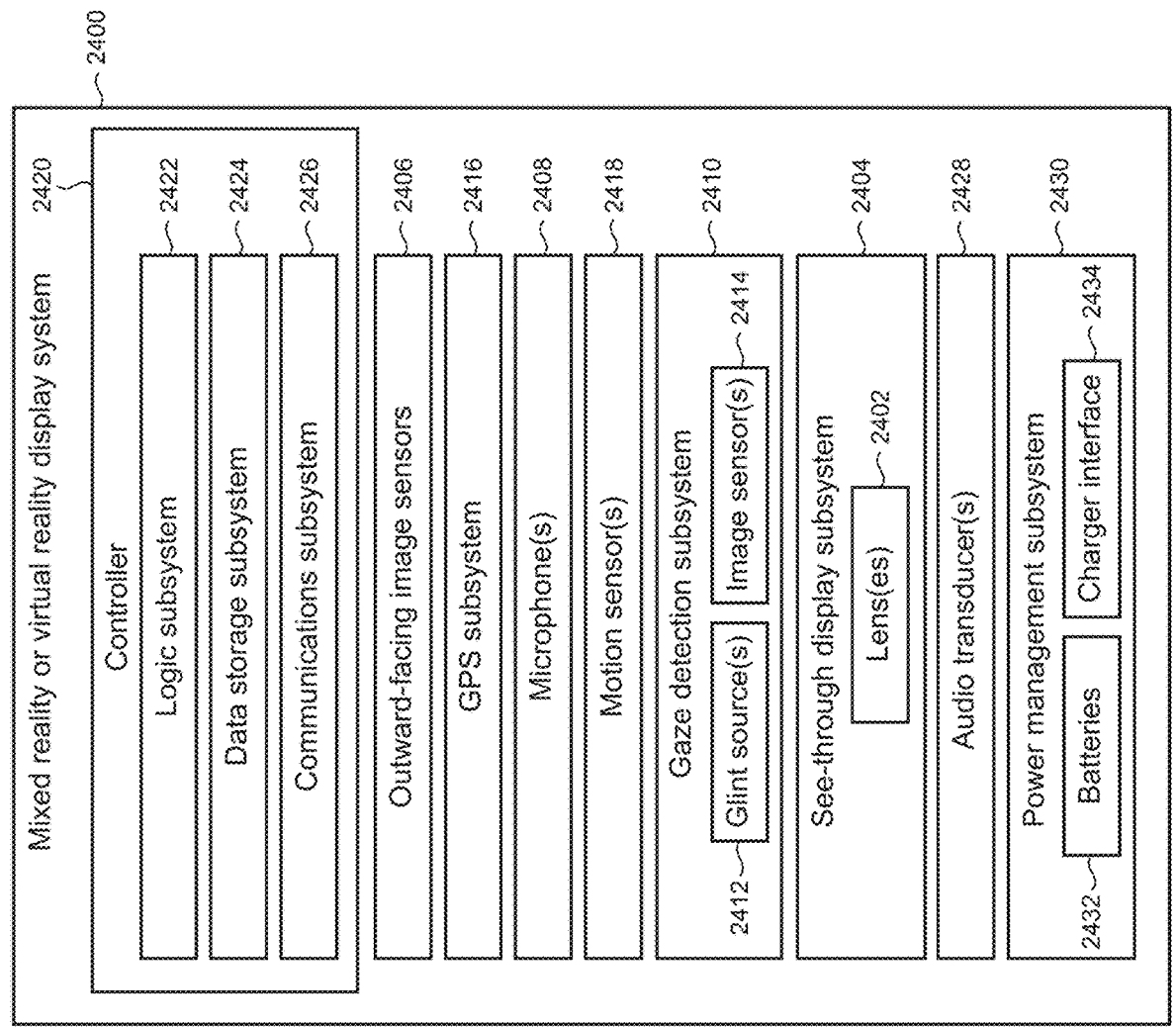
FIG. 25 shows a block diagram of an illustrative example of a wearable virtual reality or mixed reality HMD device.

FIG. 24 shows one particular illustrative example of a wearable augmented reality or virtual reality display system 2400, and FIG. 25 shows a functional block diagram of the system 2400. Display system 2400 comprises one or more lenses 2402 that form a part of a see-through display subsystem 2404, such that images may be displayed using lenses 2402 (e.g. using projection onto lenses 2402, one or more waveguide systems incorporated into the lenses 2402, and/or in any other suitable manner). Display system 2400 further comprises one or more outward-facing image sensors 2406 configured to acquire images of a background scene and/or physical environment being viewed by a user, and may include one or more microphones 2408 configured to detect sounds, such as voice commands from a user. Outward-facing image sensors 2406 may include one or more depth sensors and/or one or more two-dimensional image sensors. In alternative arrangements, as noted above, an augmented reality or virtual reality display system, instead of incorporating a see-through display subsystem, may display augmented reality or virtual reality images through a viewfinder mode for an outward-facing image sensor.

The display system 2400 may further include a gaze detection subsystem 2410 configured for detecting a direction of gaze of each eye of a user or a direction or location of focus, as described above. Gaze detection subsystem 2410 may be configured to determine gaze directions of each of a user's eyes in any suitable manner. For example, in the illustrative example shown, a gaze detection subsystem 2410 includes one or more glint sources 2412, such as infrared light sources, that are configured to cause a glint of light to reflect from each eyeball of a user, and one or more image sensors 2414, such as inward-facing sensors, that are configured to capture an image of each eyeball of the user. Changes in the glints from the user's eyeballs and/or a location of a user's pupil, as determined from image data gathered using the image sensor(s) 2414, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 2410 may have any suitable number and arrangement of light sources and image sensors. In some implementations, the gaze detection subsystem 2410 may be omitted.

The display system 2400 may also include additional sensors. For example, display system 2400 may comprise a global positioning system (GPS) subsystem 2416 to allow a location of the display system 2400 to be determined. This may help to identify real-world objects, such as buildings, etc. that may be located in the user's adjoining physical environment.

The display system 2400 may further include one or more motion sensors 2418 (e.g., inertial, multi-axis gyroscopic, or acceleration sensors) to detect movement and position/orientation/pose of a user's head when the user is wearing the system as part of an augmented reality or virtual reality HMD device. Motion data may be used, potentially along with eye-tracking glint data and outward-facing image data, for gaze detection, as well as for image stabilization to help correct for blur in images from the outward-facing image sensor(s) 2406. The use of motion data may allow changes in gaze location to be tracked even if image data from outward-facing image sensor(s) 2406 cannot be resolved.

In addition, motion sensors 2418, as well as microphone (s) 2408 and gaze detection subsystem 2410, also may be employed as user input devices, such that a user may interact with the display system 2400 via gestures of the eye, neck and/or head, as well as via verbal commands in some cases. It may be understood that sensors illustrated in FIGS. 24 and 25 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 2400 can further include a controller 2420 having a logic subsystem 2422 and a data storage subsystem 2424 in communication with the sensors, gaze detection subsystem 2410, display subsystem 2404, and/or other components through a communications subsystem 2426. The communications subsystem 2426 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2424 may include instructions stored thereon that are executable by logic subsystem 2422, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 2400 is configured with one or more audio transducers 2428 (e.g., speakers, earphones, etc.) so that audio can be utilized as part of an augmented reality or virtual reality experience. A power management subsystem 2430 may include one or more batteries 2432 and/or protection circuit modules (PCMs) and an associated charger interface 2434 and/or remote power interface for supplying power to components in the display system 2400.

It may be appreciated that the display system 2400 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Figure 26:
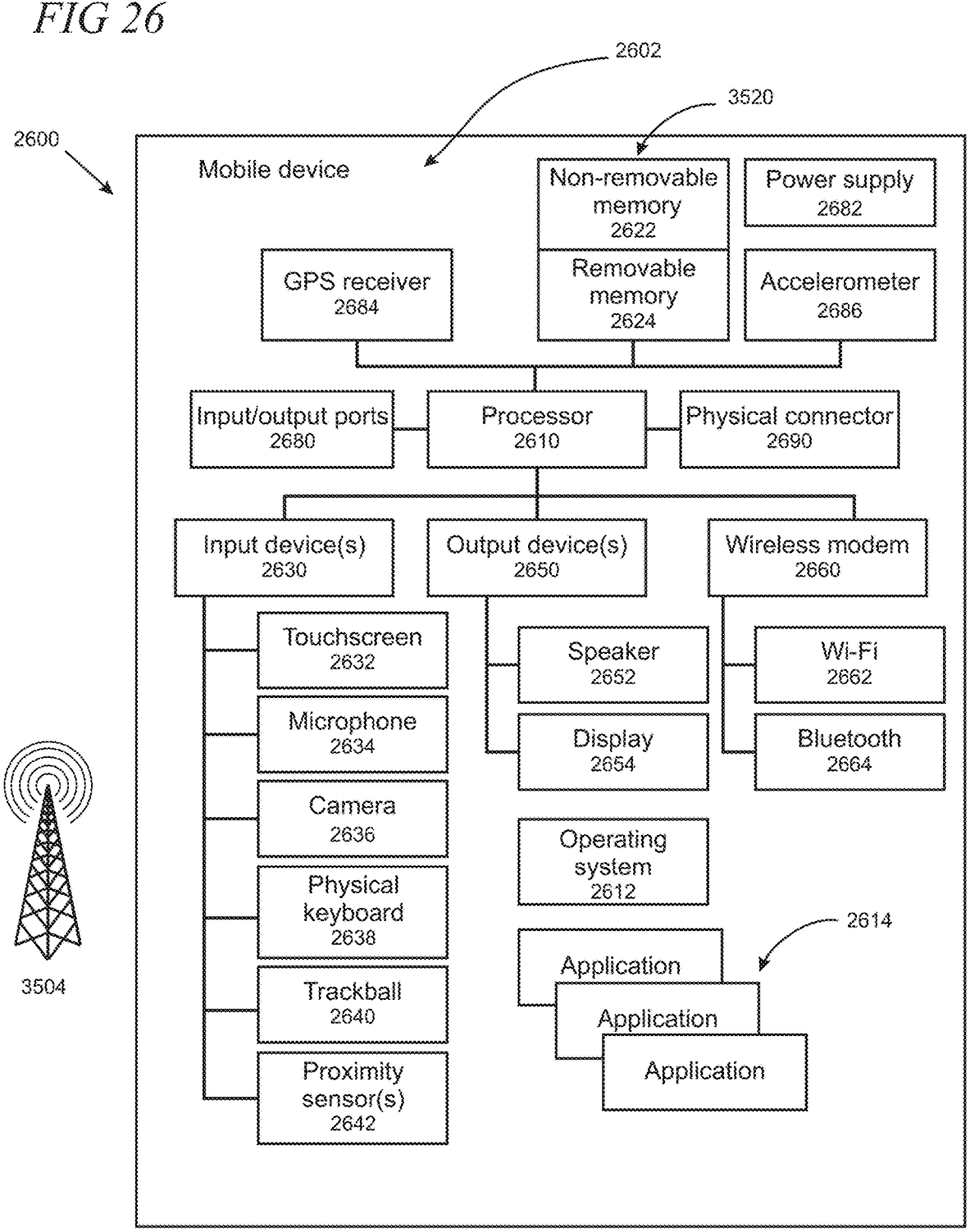
FIG. 26 is a block diagram of an illustrative device such as a mobile phone or smartphone.

FIG. 26 is a functional block diagram of an illustrative device 2600 such as a mobile phone or smartphone including a variety of optional hardware and software components, shown generally at 2602. Any component 2602 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 2604, such as a cellular or satellite network.

The illustrated device 2600 can include a controller or processor 2610 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2612 can control the allocation and usage of the components 2602, including power states, above-lock states, and below-lock states, and provides support for one or more application programs 2614. The application programs can include common mobile computing applications (e.g., image-capture applications, email applications, calendars, contact managers, web browsers, messaging applications), or any other computing application.

The illustrated device 2600 can include memory 2620. Memory 2620 can include non-removable memory 2622 and/or removable memory 2624. The non-removable memory 2622 can include RAM, ROM, Flash memory, a hard disk, or other well-known memory storage technologies. The removable memory 2624 can include Flash memory or a Subscriber Identity Module (SIM) card, which is well known in GSM (Global System for Mobile communications) systems, or other well-known memory storage technologies, such as "smart cards." The memory 2620 can be used for storing data and/or code for running the operating system 2612 and the application programs 2614. Example data can include web pages, text, images, sound files, video data, or other data sets to be sent to and/or received from one or more network servers or other devices via one or more wired or wireless networks.

The memory 2620 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 2600.

The memory 2620 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 2600 can support one or more input devices 2630; such as a touchscreen 2632; microphone 2634 for implementation of voice input for voice recognition, voice commands and the like; camera 2636; physical keyboard 2638; trackball 2640; and/or proximity sensor 2642; and one or more output devices 2650, such as a speaker 2652 and one or more displays 2654. Other input devices (not shown) using gesture recognition may also be utilized in some cases. Other possible output devices (not shown) can include piezoelectric or haptic output devices. Some devices can serve more than one input/output function. For example, touchscreen 2632 and display 2654 can be combined into a single input/output device.

A wireless modem 2660 can be coupled to an antenna (not shown) and can support two-way communications between the processor 2610 and external devices, as is well understood in the art. The modem 2660 is shown generically and can include a cellular modem for communicating with the mobile communication network 2604 and/or other radio-based modems (e.g., Bluetooth 2664 or Wi-Fi 2662). The wireless modem 2660 is typically configured for communication with one or more cellular networks, such as a GSM network for data and voice communications within a single cellular network, between cellular networks, or between the device and a public switched telephone network (PSTN).

The device can further include at least one input/output port 2680, a power supply 2682, a satellite navigation system receiver 2684, such as a GPS receiver, an accelerometer 2686, a gyroscope (not shown), and/or a physical connector 2690, which can be a USB port, IEEE 1394 (FireWire) port, and/or an RS-232 port. The illustrated components 2602 are not required or all-inclusive, as any components can be deleted and other components can be added.

Based on the foregoing, it may be appreciated that technologies for task automation using location-awareness of multiple devices have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

Figure 27:
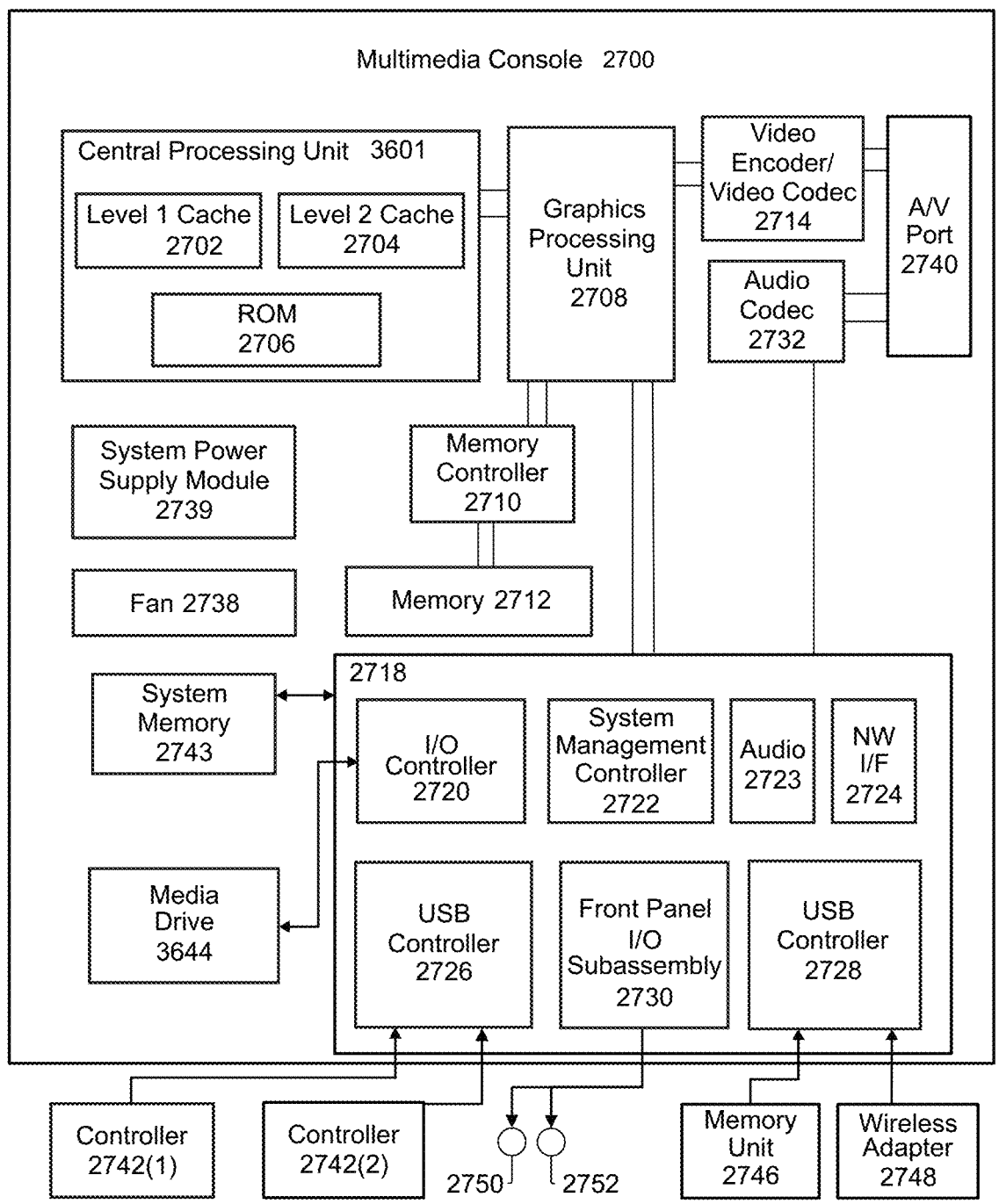
FIG. 27 is a block diagram of an illustrative multimedia console.

FIG. 27 is an illustrative functional block diagram of a multimedia console 2700. The multimedia console 2700 has a central processing unit (CPU) 2701 having a level 1 cache 2702, a level 2 cache 2704, and a Flash ROM (Read Only Memory) 2706. The level 1 cache 2702 and the level 2 cache 2704 temporarily store data and hence reduce the number of memory access cycles, thereby improving processing speed and throughput. The CPU 2701 may be configured with more than one core, and thus, additional level 1 and level 2 caches 2702 and 2704. The Flash ROM 2706 may store executable code that is loaded during an initial phase of a boot process when the multimedia console 2700 is powered ON.

A graphics processing unit (GPU) 2708 and a video encoder/video codec (coder/decoder) 2714 form a video processing pipeline for high speed and high resolution graphics processing. Data is carried from the GPU 2708 to the video encoder/video codec 2714 via a bus. The video processing pipeline outputs data to an A/V (audio/video) port 2740 for transmission to a television or other display. A memory controller 2710 is connected to the GPU 2708 to facilitate processor access to various types of memory 2712, such as, but not limited to, a RAM.

The multimedia console 2700 includes an I/O controller 2720, a system management controller 2722, an audio processing unit 2723, a network interface controller 2724, a first USB (Universal Serial Bus) host controller 2726, a second USB controller 2728, and a front panel I/O subassembly 2730 that are preferably implemented on a module 2718. The USB controllers 2726 and 2728 serve as hosts for peripheral controllers 2742(1) and 2742(2), a wireless adapter 2748, and an external memory device 2746 (e.g., Flash memory, external CD/DVD ROM drive, removable media, etc.). The network interface controller 2724 and/or wireless adapter 2748 provide access to a network (e.g., the Internet, home network, etc.) and may be any of a wide variety of various wired or wireless adapter components including an Ethernet card, a modem, a Bluetooth module, a cable modem, or the like.

System memory 2743 is provided to store application data that is loaded during the boot process. A media drive 2744 is provided and may comprise a DVD/CD drive, hard drive, or other removable media drive, etc. The media drive 2744 may be internal or external to the multimedia console 2700. Application data may be accessed via the media drive 2744 for execution, playback, etc. by the multimedia console 2700. The media drive 2744 is connected to the I/O controller 2720 via a bus, such as a Serial ATA bus or other high speed connection (e.g., IEEE 1394).

The system management controller 2722 provides a variety of service functions related to assuring availability of the multimedia console 2700. The audio processing unit 2723 and an audio codec 2732 form a corresponding audio processing pipeline with high fidelity and stereo processing. Audio data is carried between the audio processing unit 2723 and the audio codec 2732 via a communication link. The audio processing pipeline outputs data to the A/V port 2740 for reproduction by an external audio player or device having audio capabilities.

The front panel I/O subassembly 2730 supports the functionality of the power button 2750 and the eject button 2752, as well as any LEDs (light emitting diodes) or other indicators exposed on the outer surface of the multimedia console 2700. A system power supply module 2739 provides power to the components of the multimedia console 2700. A fan 2738 cools the circuitry within the multimedia console 2700.

The CPU 2701, GPU 2708, memory controller 2710, and various other components within the multimedia console 2700 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 2700 is powered ON, application data may be loaded from the system memory 2743 into memory 2712 and/or caches 2702 and 2704 and executed on the CPU 2701. The application may present a graphical user interface that provides a consistent user experience when navigating to different media types available on the multimedia console 2700. In operation, applications and/or other media contained within the media drive 2744 may be launched or played from the media drive 2744 to provide additional functionalities to the multimedia console 2700.

The multimedia console 2700 may be operated as a standalone system by simply connecting the system to a television or other display. In this standalone mode, the multimedia console 2700 allows one or more users to interact with the system, watch movies, or listen to music. However, with the integration of broadband connectivity made available through the network interface controller 2724 or the wireless adapter 2748, the multimedia console 2700 may further be operated as a participant in a larger network community.

When the multimedia console 2700 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 2700 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 2701 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active. Input devices (e.g., controllers 2742(1) and 2742(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. Various exemplary embodiments of the present automatic responses to incoming calls based on user activity are now presented by way of illustration and not as an exhaustive list of all embodiments. An example includes a method for automatically generating a response to incoming telephone calls to one or more computing devices, the telephone calls carried over an IMS (Internet Protocol Multimedia Subsystem) network, the method comprising: receiving registration data from a registrar in the IMS network, the registration data describing registrations of the one or more computing devices to receive IMS network services; monitoring user interactions with each of the one or more computing devices to identify an active state of each of the one or more computing devices; and utilizing the identified active state and the registration data to dynamically generate a response to the incoming telephone call.

Various exemplary embodiments of the present automatic responses to incoming calls based on user activity are now presented by way of illustration and not as an exhaustive list of all embodiments. An example includes a method for automatically generating a response to incoming telephone calls to one or more computing devices, the telephone calls carried over an IMS (Internet Protocol Multimedia Subsystem) network, the method comprising: receiving registration data from a registrar in the IMS network, the registration data describing registrations of the one or more computing devices to receive IMS network services; monitoring user interactions with each of the one or more computing devices to identify an active state of each of the one or more computing devices; and utilizing the identified active state and the registration data to dynamically generate a response to the incoming telephone call.

In another example, the registration data describes device state or device capabilities. In another example, the response is provided using one of audio, video, or text-based message. In another example, the response is an audio response using synthesized voice that is played to a calling party device using audio associated with a connected telephone call. In another example, the response is delivered using RCS (Rich Communications Services) supported by the IMS network. In another example, the response is delivered with an over the top service using the IMS network. In another example, the method further includes receiving sensor data from sensors from one or more of the computing devices and using the sensor data when dynamically generating the response, wherein the sensor data is collected from a device sensor, the device sensor including one or more of camera, accelerometer, location-awareness component, thermometer, altimeter, heart rate sensor, biometric data sensor, barometer, microphone, or proximity sensor. In another example, the method further includes receiving contextual data from one or more of the computing devices and using the contextual data when dynamically generating the response, wherein the contextual data is associated with the one or more devices or respective users of the one or more devices. In another example, the contextual data comprises one or more of time/date, location of the user or device, language, schedule, applications installed on the device, user preferences, user behaviors, user activities, stored contacts, call history, messaging history, browsing history, or application usage history. In another example, the contextual data includes application data from one or more applications executing on a computing device. In another example, the one or more applications support functionalities including one or more of business productivity, email, messaging, scheduling application, task list, telephony, virtual meeting, or calendar.

A further example includes one or more hardware-based computer-readable memory devices storing instructions which, when executed by one or more processors disposed in a computer server, cause the computer server to: monitor user interactions with a plurality of telephony-enabled computing devices; identify an active computing device using the monitored user interactions; receive data describing state of the active computing device, type of the active computing device, or capabilities of the active computing device; determine that a telephone call from a calling party is incoming to the active computing device; dynamically generate an audio, video, or text-based response to the incoming call using the received data; and deliver the dynamically generated response to the incoming telephone call to a device associated with the calling party.

In another example, the executed instructions cause the computer server to deliver the response over an IMS (Internet Protocol Multimedia Subsystem) network. In another example, the received data include registration data associated with registration of the plurality of telephony-enabled computing devices with an IMS (Internet Protocol Multimedia Subsystem) network. In another example, the capabilities of the active computing device include capabilities to support RCS (Rich Communication Services). In another example, the computer server is a network element in an IMS (Internet Protocol Multimedia Subsystem) network.

A further example includes a device, comprising: one or more processors; a user interface (UI) configured to enable interactions with a user of the device; and a hardware-based memory device storing computer-readable instructions which, when executed by the one or more processors, cause the device to arrange the UI to enable a device user to opt in to monitoring of context associated with the device or the user wherein the context describes an operational state of the device or user activities when interacting with the device, transmit the monitored context to a remote service so that the remote service can use the monitored context to dynamically generate a response to an un-answered incoming telephone call from a caller to the device and deliver the dynamically generated response to the caller's device, surface a notification on the UI of the delivery of the dynamically generated response to the incoming telephone call.

In another example, the incoming call is received over an IMS (Internet Protocol Multimedia Subsystem) network. In another example, the executed instructions further cause the device to arrange the UI to enable the user to specify behaviors of the remote service when dynamically generating the response. In another example, the user is enabled to select a contact or a group of contacts to receive the dynamically generated response.

The subject matter described above is provided by way of illustration only and is not be construed as limiting. Various modifications and changes may be made to the subject matter described herein without following the example embodiments and applications illustrated and described, and without departing from the true spirit and scope of the present invention, which is set forth in the following claims.

What is claimed:

1. A method performed by an automated response service for automatically generating a response to incoming communications to one or more computing devices, the communications carried over an IMS (Internet Protocol Multimedia Subsystem) network, the method comprising:
   receiving current registration data from a registrar in the IMS network, the registration data including current registrations of the one or more computing devices to receive IMS network services, in which the received current registration data enables identification of device capabilities of the currently registered computing devices to the automated response system;
   monitoring user interactions with each of the one or more computing devices to identify an active state of each of the one or more computing devices;
   receiving contextual data from the one or more computing devices, wherein the contextual data identifies context about the user and identified active computing devices;
   receiving user preferences that indicate an extent to which the contextual data is utilized to generate a response to an incoming call; and
   utilizing the contextual data, identified active state, user preferences, and the identified device capabilities from the current registration data to dynamically generate a response to an incoming communication.

2. The method of claim 1 in which the current registration data describes device state or device capabilities.

3. The method of claim 1 in which the response is provided using one or more of audio, video, or text-based message.

4. The method of claim 1 in which the response includes an audio response using synthesized voice that is played to a remote party device using audio associated with a connected communication.

5. The method of claim 1 in which the response is delivered using RCS (Rich Communication Services) supported by the IMS network.

6. The method of claim 1 in which the response is delivered with an over the top service using the IMS network.

7. The method of claim 1 further including receiving sensor data from sensors from the one or more computing devices and using the sensor data when dynamically generating the response, wherein the sensor data is collected from a device sensor, the device sensor including one or more of camera, accelerometer, location-awareness component, thermometer, altimeter, heart rate sensor, biometric data sensor, barometer, microphone, or proximity sensor.

8. The method of claim 1 in which the contextual data further comprises one or more of time/date, location of the user or respective computing device, language, schedule, applications installed on the respective computing device, user preferences, user behaviors, user activities, stored contacts, call history, messaging history, browsing history, or application usage history.

9. The method of claim 1 in which the contextual data includes application data from one or more applications executing on the respective computing device.

10. The method of claim 9 in which the one or more applications support functionalities including one or more of business productivity, email, messaging, scheduling application, task list, telephony, virtual meeting, or calendar.

11. One or more hardware-based computer-readable memory devices storing instructions which, when executed by one or more processors disposed in a computer server, cause the computer server to:
    monitor user interactions with a plurality of computing devices;
    develop contextual data about a user of at least one of the plurality of computing devices using the monitored user interactions;
    identify an active computing device using the monitored user interactions;
    receive data describing a state of the active computing device and capabilities of the active computing device;
    receive preferences from the user that indicate an extent to which the contextual data is utilized to generate a response to an incoming call;
    determine that a communication from a remote party is incoming to the active computing device;
    dynamically generate a response to the incoming communication based on the state, capabilities, contextual data, and preferences; and
    deliver the dynamically generated response to the incoming communication to a device associated with the remote party.

12. The one or more hardware-based computer-readable memory devices of claim 11 in which the executed instructions cause the computer server to deliver the response over an IMS (Internet Protocol Multimedia Subsystem) network.

13. The one or more hardware-based computer-readable memory devices of claim 11 in which the received data include registration data associated with registration of the plurality of computing devices with an IMS (Internet Protocol Multimedia Subsystem) network.

14. The one or more hardware-based computer-readable memory devices of claim 11 in which the capabilities of the active computing device include capabilities to support RCS (Rich Communication Services).

15. The one or more hardware-based computer-readable memory devices of claim 11 in which the computer server is a network element in an IMS (Internet Protocol Multimedia Subsystem) network.

16. A device, comprising:
    one or more processors;
    a user interface (UI) configured to enable interactions with a user of the device; and
    a hardware-based memory device storing computer-readable instructions which, when executed by the one or more processors, cause the device to
    arrange the UI to enable the user to opt in to monitoring of contextual data associated with the device and the user, wherein the contextual data describes context for the user when interacting with the device and content for at least an in-use application running on the device and wherein the UI is further arranged to enable the user to select preferences for an extent to which the contextual data is utilized to generate a response to an incoming call, transmit capabilities of the device to a remote service, transmit the monitored contextual data to the remote service in which the remote service utilizes the monitored contextual data and the device capabilities to dynamically generate a response to an incoming call from a caller to the device and deliver the dynamically generated response to the caller's device, wherein the dynamically generated response includes the content associated with the in-use application, and surface a notification on the UI of the delivery of the dynamically generated response to the incoming call.

17. The device of claim 16 in which the incoming call is received over an IMS (Internet Protocol Multimedia Subsystem) network.

18. The device of claim 16 in which the executed instructions further cause the device to arrange the UI to enable the user to specify behaviors of the remote service when dynamically generating the response.

19. The device of claim 18 in which the user is enabled to select a contact or a group of contacts to receive the dynamically generated response.

* * * * *